US008241790B2

(12) United States Patent
Ohzuku et al.

(10) Patent No.: US 8,241,790 B2
(45) Date of Patent: Aug. 14, 2012

(54) POSITIVE ELECTRODE ACTIVE MATERIAL AND NON-AQUEOUS ELECTROLYTE SECONDARY BATTERY CONTAINING THE SAME

(75) Inventors: Tsutomu Ohzuku, Nara (JP); Hiroshi Yoshizawa, Hirakata (JP); Masatoshi Nagayama, Hirakata (JP)

(73) Assignees: Panasonic Corporation, Osaka (JP); Osaka City University, Osaka (JP)

( * ) Notice: Subject to any disclaimer, the term of this patent is extended or adjusted under 35 U.S.C. 154(b) by 563 days.

(21) Appl. No.: 10/629,815

(22) Filed: Jul. 30, 2003

(65) Prior Publication Data

US 2004/0126660 A1 Jul. 1, 2004

(30) Foreign Application Priority Data

Aug. 5, 2002 (JP) ................................ 2002-227707

(51) Int. Cl.
*H01M 4/13* (2010.01)
*H01M 4/88* (2006.01)
*C01G 1/00* (2006.01)
(52) U.S. Cl. ...................... 429/223; 429/209; 429/218.1; 429/224; 252/182.1; 423/138
(58) Field of Classification Search .................. 429/220, 429/223, 224
See application file for complete search history.

(56) References Cited

U.S. PATENT DOCUMENTS

| 5,160,712 A | 11/1992 | Thackeray et al. |
| 5,264,201 A | 11/1993 | Dahn et al. |
| 5,370,948 A | 12/1994 | Hasegawa et al. |
| 5,393,622 A | 2/1995 | Nitta et al. |
| 5,626,635 A | 5/1997 | Yamaura et al. |
| 5,629,110 A | 5/1997 | Kobayashi et al. |
| 5,738,957 A | 4/1998 | Amine et al. |
| 5,866,279 A * | 2/1999 | Wada et al. ................... 429/224 |
| 5,985,237 A | 11/1999 | Lu et al. |
| 6,045,771 A | 4/2000 | Matsubara et al. |
| 6,132,639 A | 10/2000 | Komatsu et al. |
| 6,168,887 B1 | 1/2001 | Dahn et al. |
| 6,241,959 B1 * | 6/2001 | Cho et al. ................... 423/594.4 |
| 6,291,107 B1 | 9/2001 | Shimizu |

(Continued)

FOREIGN PATENT DOCUMENTS

EP 0 554 906 A1 8/1993

(Continued)

OTHER PUBLICATIONS

Ohzuku, T. et al., "Electrochemistry amd Structural Chemistry of $LiNiO_2$ (R3m) for 4 Volt Secondary Lithium Cells" J. Electrochem. Soc., Jul. 1993, vol. 140, No. 7 pp. 1862-1870.

(Continued)

*Primary Examiner* — Cynthia Lee
(74) *Attorney, Agent, or Firm* — McDermott Will & Emery LLP

(57) ABSTRACT

In a non-aqueous electrolyte secondary battery comprising: a negative electrode containing, as a negative electrode active material, at least a material capable of absorbing and desorbing lithium ions or metal lithium; a positive electrode; and an electrolyte, an oxide containing nickel and manganese elements, the material comprising primary particles of the oxide having a twining portion and a superlattice arrangement of a $[\sqrt{3}\times\sqrt{3}]$ R30° when assigned as R3-m is used as a positive electrode active material.

13 Claims, 27 Drawing Sheets

U.S. PATENT DOCUMENTS

| | | |
|---|---|---|
| 6,352,794 B1 | 3/2002 | Nakanishi et al. |
| 6,416,902 B1 * | 7/2002 | Miyasaka ............. 429/223 |
| 6,436,577 B1 | 8/2002 | Kida et al. |
| 6,551,744 B1 * | 4/2003 | Ohzuku et al. ......... 429/223 |
| 6,582,854 B1 | 6/2003 | Qi et al. |
| 6,660,432 B2 | 12/2003 | Paulsen et al. |
| 6,753,111 B2 | 6/2004 | Kweon et al. |
| 6,773,852 B2 | 8/2004 | Cho et al. |
| 6,808,848 B2 | 10/2004 | Nakanishi et al. |
| 6,964,828 B2 | 11/2005 | Lu et al. |
| 7,029,793 B2 | 4/2006 | Nakagawa et al. |
| 7,078,128 B2 | 7/2006 | Lu et al. |
| 2001/0024754 A1 | 9/2001 | Fukuzawa et al. |
| 2002/0009645 A1 | 1/2002 | Shima et al. |
| 2002/0197532 A1 | 12/2002 | Thackeray et al. |
| 2003/0054251 A1 | 3/2003 | Ohzuku et al. |
| 2003/0082448 A1 | 5/2003 | Cho et al. |
| 2003/0082452 A1 | 5/2003 | Ueda et al. |
| 2003/0087154 A1 | 5/2003 | Ohzuku et al. |
| 2003/0129496 A1 | 7/2003 | Kasai et al. |
| 2003/0165737 A1 | 9/2003 | Nakagawa et al. |
| 2003/0170540 A1 | 9/2003 | Ohzuku et al. |
| 2004/0058243 A1 | 3/2004 | Ohzuku et al. |
| 2004/0110063 A1 | 6/2004 | Uchitomi et al. |
| 2005/0079418 A1 | 4/2005 | Kelley et al. |
| 2005/0147889 A1 | 7/2005 | Ohzuku et al. |
| 2005/0271576 A1 | 12/2005 | Awano et al. |
| 2006/0099508 A1 * | 5/2006 | Thackeray et al. ........ 429/231.1 |
| 2006/0204847 A1 | 9/2006 | Ohzuku et al. |
| 2007/0009424 A1 | 1/2007 | Ohzuku et al. |

FOREIGN PATENT DOCUMENTS

| | | |
|---|---|---|
| EP | 0 630 064 | 12/1994 |
| EP | 0 989 622 A1 | 3/2000 |
| EP | 1 026 765 | 8/2000 |
| EP | 1 073 136 | 1/2001 |
| EP | 1 295 851 A1 | 3/2003 |
| EP | 1 309 022 A2 | 5/2003 |
| JP | 63-121258 | 5/1988 |
| JP | 3244314 | 10/1991 |
| JP | 4-267053 | 9/1992 |
| JP | 05-242891 | 9/1993 |
| JP | 05-283076 | 10/1993 |
| JP | 5-283076 A | 10/1993 |
| JP | 06-072708 | 3/1994 |
| JP | 6-96768 | 4/1994 |
| JP | 7-37576 | 2/1995 |
| JP | 8-138670 A | 5/1996 |
| JP | 8-171910 A | 7/1996 |
| JP | 08-213015 A | 8/1996 |
| JP | 08-217452 | 8/1996 |
| JP | 2547992 | 10/1996 |
| JP | 09-055210 | 2/1997 |
| JP | 9-129229 A | 5/1997 |
| JP | 9-129230 | 5/1997 |
| JP | 9-129230 A | 5/1997 |
| JP | 09-232002 | 9/1997 |
| JP | 10-69910 | 3/1998 |
| JP | 8-171910 | 7/1998 |
| JP | 10-194745 | 7/1998 |
| JP | 10-265225 | 10/1998 |
| JP | 10-310433 | 11/1998 |
| JP | 10-316431 | 12/1998 |
| JP | 11-1323 A | 1/1999 |
| JP | 11001323 | 1/1999 |
| JP | 11-60246 A | 3/1999 |
| JP | 11071115 | 3/1999 |
| JP | 11-167919 A | 6/1999 |
| JP | 11-260364 | 9/1999 |
| JP | 11-310416 | 9/1999 |
| JP | 11-292547 A | 10/1999 |
| JP | 11-307094 | 11/1999 |
| JP | 11-312519 | 11/1999 |
| JP | 11-339802 | 12/1999 |
| JP | 2000-77071 A | 3/2000 |
| JP | 2000-082466 | 3/2000 |
| JP | 2000-133262 | 5/2000 |
| JP | 2000-149923 A | 5/2000 |
| JP | 2000149942 | 5/2000 |
| JP | 2000-182618 A | 6/2000 |
| JP | 2000-195514 | 7/2000 |
| JP | 2000-223122 A | 8/2000 |
| JP | 2000-251892 | 9/2000 |
| JP | 2000-268874 A | 9/2000 |
| JP | 2000-323123 | 11/2000 |
| JP | 2001-23640 A | 1/2001 |
| JP | 2001-185145 A | 1/2001 |
| JP | 2001-035495 A | 2/2001 |
| JP | 2001-085006 | 3/2001 |
| JP | 2001-143702 | 5/2001 |
| JP | 2001-185145 A | 7/2001 |
| JP | 2001-185153 A | 7/2001 |
| JP | 2001-192210 | 7/2001 |
| JP | 2001-202959 A | 7/2001 |
| JP | 2001-243952 | 9/2001 |
| JP | 2001-319688 | 11/2001 |
| JP | 2001-332261 | 11/2001 |
| JP | 3244314 | 1/2002 |
| JP | 2002-42813 | 2/2002 |
| JP | 2002-042813 * | 2/2002 |
| JP | 2002-042889 | 2/2002 |
| JP | 2002-100358 | 4/2002 |
| JP | 2002-110231 | 4/2002 |
| JP | 2002-145623 | 5/2002 |
| JP | 2002-158011 | 5/2002 |
| JP | 2002-289194 | 10/2002 |
| JP | 2002-304993 A | 10/2002 |
| JP | 2002-338250 | 11/2002 |
| JP | 2003-059490 | 2/2003 |
| JP | 2003-137555 | 5/2003 |
| JP | 2003-203633 A | 7/2003 |
| JP | 2003-221236 | 8/2003 |
| JP | 2004-002141 | 1/2004 |
| KR | 2002-0019221 | 3/2002 |
| KR | 2000-0017619 | 3/2003 |
| WO | WO 98/57386 | 12/1998 |
| WO | WO 01/99215 A1 | 12/2001 |
| WO | WO 02/40404 | 5/2002 |
| WO | WO 02/40404 A1 | 5/2002 |
| WO | WO 03/015198 A2 | 2/2003 |

OTHER PUBLICATIONS

Spahr, M. et al. "Characterization of Layered Lithium Nickel Manganese Oxides Synthesized by a Novel Oxidative Coprecipitation Method and Their Electrochemical Performance as Lithium Insertion Electrode Materials" J. Electrochem. Soc., Apr. 1998, vol. 145, No. 4, pp. 1113-1120.

Kanno, R. et al., "Structure and Physical Properties in Cathode Materials for Lithium Secondary cells-13 Lithium Nickel Oxides and Lithium Manganese Oxide" Department of Chemistry, Faculty of Science, Kobe University, announced on Dec. 7, 1998, pp. 85-95. (Partial translation attached).

Aral, H. et al., "Electrochemical and Thermal Behavior of $LiNi_{1-z}M_zO_2$(M=Co, Mn, Ti)" J. Electrochem. Soc., Sep. 1997, vol. 144, No. 9, pp. 3117-3125.

B.J. Neudecker et al., "Lithium Mangnese Nickel Oxides $Li_x(Mn_y, Ni_{1-y})_{2-x}O_2$", J. Electrochem. Soc., vol. 145, No. 12, Dec. 1998, pp. 4148-4159.

E. Rossen et al., "Structure and electrochemistry of $Li_xMn_yNi_{1-y}O_2$", Solid State Ionics 57(1992) pp. 331-318.

Tabuchi M et al., "Electrochemical and magnetic properties of lithium manganese oxide spinels prepared by oxidation at low temperature of hydrothermally obtained LiMnO2", vol. 89, No. 1-2, Aug. 1, 1996, pp. 53-63, XP004070124.

Ohzuku, T. et al., "Synthesis and Characterization of $LiNiO_2$ (R3m) for Rechargeable Nonaqueous Cells," Chemistry Express, vol. 6, No. 3, Mar. 1991, pp. 161-164, Kinki Chemical Society, Japan.

Ohzuku, T. et al., "New Route to Prepare $LiNiO_2$ for 4-Volts Secondary Lithium Cells," Chemistry Express, vol. 7, No. 9, pp. 689-692, 1992, Kinki Chemical Society, Japan.

Ohzuku, T. et al., "Synthesis and Characterization of $LiAl_{1/4}Ni_{3/4}O_2$ (R3m) for Lithium-Ion (Shuttlecock) Batteries," Journal of the Electrochemical Society, vol. 142, No. 12, The Electrochemical Society, Inc., Dec. 1995, pp. 4033-4039.

Cho, et al. Preparation of Layered Li[Ni$_{1/3}$Mn$_{1/3}$Co$_{1/3}$]O$_z$ as a Cathode for Lithium Secondary Battery by Carbonate Coprecipitation Method, Chemistry Letters, Feb. 24, 2004, p. 704-705, vol. 33 No. 6, The Chemical Society of Japan, Japan.
Ohzuku, T. et al., "Comparative Study of LiCoO$_2$, LiNi$_{1/2}$Co$_{1/2}$O$_2$ and LiNiO$_2$For 4 Volt Secondary Lithium Cells," The Journal of The International Society of Electrochemistry, Jun. 1993, p. 1159-1167, vol. 38 No. 9, Pergamon Press.
Ohzuku, T. et al., "Why transition metal (di) Oxides are the most attractive materials for batteries," Solid State Ionics, Aug. 1994, p. 202-211, vol. 69 No. 3,4, North-Holland, The Netherlands.
Ohzuku, T. et al., "Solid State Electrochemistry of Intercalation Compound of LiAl$_{1/2}$Ni$_{1/2}$O$_2$(R3m) for Lithium-Ion Batteries," Electrochemistry of Intercalation, (1998), p. 1209-1214, Volume No. 12, The Electrochemical Society of Japan, JAPAN.
Observations of a third party submitted to Japanese Patent Application No. 2000-227858, mailed on Aug. 1, 2005.
Observations of a third party submitted to Japanese patent application No. 2002-303294, mailed on Jan. 18, 2007.
M. Yoshio et al., "Preparation and properties of LiCo$_y$Mn$_2$Ni$_{1-z-y}$O$_2$ as a cathode for lithium ion batteries," Journal of Power Sources 90 (2000), pp. 176-181, Elsevier.
Lu, Z. et al., "Layered Ni[NiCo$_{1-2x}$Mn$_x$]O$_2$ Cathode Materials for Lithium-Ion Batteries," Electrochemical and Solid-State Letters, vol. 4, No. 12, pp. A200-A203, Dec. 2001, The Electrochemical Society.
Y. Terada et al., "In Situ XAFS Analysis of Li(Mn,$M$)$_2$O$_4$ ($M$= Cr, Co, Ni) 5V Cathode materials for Lithium-Ion Secondary Batteries," Journal of Solid State Chemistry 156, pp. 286-291, 2001.
Lu, Z. et al., "Layered Cathode Materials Li[Ni$_x$Li$_{(1/3-2x/3)}$Mn$_{(2/3-x3)}$]O$_2$ for Lithium-Ion Batteries," Electrochemical and Solid-State Letters, 4 (11), pp. A191-A194(2001), The Electrochemical Society, Inc.
H-S Park et al., "Relationship between Chemical Bonding Character and Electrochemical Performance in Nickel-Substituted Lithium Manganes Oxides," J. Phys. Chem., B 2001, 105, pp. 4860-4866, American Chemical Society.
Ohzuku at al. Chemistry Letters, vol. 30 (2001), No. 7, pp. 642-643.
Ohzuku at al. Chemistry Letters, vol. 30 (2001), No. 9, pp. 744-745.
Oiming Zhong et al., "Synthesis and Electrochemistry of LiNi$_x$Mn$_{2-x}$O$_4$", J. Electrochem. Soc., vol. 144, No. 1, Jan. 1997, pp. 205-213.
M.M. Grush at al., "Correlating Electronic Structure with Cycling Performance of Substituted LiMn$_2$O$_4$ Electrode Materials: A Study Using the Techniques of Soft X-ray Absorption and Emission", Chem. Mater, 2000, 12, pp. 659-664.
"Layered Cathode Materials Li[Ni$_x$Li$_{(1/3-2x/3)}$Mn$_{(2/3-x/3)}$]O$_2$ for Lithium•Ion Batteries." Zhonghua Lu, et al. Electrochemical and Solid-State Letters 4(11) (2001), pp. A191-A194.
"Relationship Between Chemical Bonding Character and Electrochemical Performance in Nickel-Substituted Lithium Manganese Oxides." Hyo-Suk Park, et al. J. Phys. Chem. B vol. 105 No. 21 (2001), pp. 4860-4866.
"Synthesis, Structure, and Electrochemical Behavior of Li[Ni$_x$Li$_{1/3-2x/3}$]O$_2$." , . Journal of the Electrochemical Society 149(6) (2002) pp. A778-A791.
"Preparation by a 'chimie deuce' route and characterization of LiNi$_z$Mn$_{1-z}$O2 (0.5≦z≦1) Cathode Materials." Daniel Caurant, et al. J. Mater. Chem. 6(7) (1998), pp. 1149-1155.
Ataushl Ueda et al., "Solid-State Redox Reactions of LiNi$_{1/2}$Co$_{1/2}$O$_2$ (R3M) for 4 Volt Secondary Lithium Cells", J. Electrochem. Soc., vol. 141, No. 8, Aug. 1994, pp. 2010-2014.
Japanese Office Action issued in Japanese Patent Application No. 2002-303294, dated Mar. 1, 2007.
Japanese Office Action issued in Japanese Patent Application No. 2003-281871, dated Feb. 1, 2007.
Korean Office Action issued in Korean Patent Application No. 10-2006-0100852, dated Jan. 17, 2007.
West et al., "Introduction for Solid-State Chemistry," Kodansha-Scientific, Mar. 20, 1996, with partial translation.
Yoshio et al., "Lithium-ion Secondary Battery," Nikkan Kogyo Shinbunsha, Mar. 29, 1996, with partial translation.

Japanese Society of Microscopy, Kanto Division, "Technique of Electron microscope technique for advanced material evaluation," Asakura-shoten, Dec. 15, 1991, with partial translation.
Saka, K, "Study of Crystal Electron Microscope," Uchida Rokakuho, Nov. 25, 1997, with partial translation.
Neudecker, B.J. et al., "Lithium Manganese Nickel Oxides Li$_x$(Mn$_y$Ni$_{1-y}$)$_{2-x}$O$_2$," J. Electrochem. Soc., Dec. 1998, p. 4148-1459, vol. 145, No. 12, The Electrochemical Society, Inc.
Yoshio, M. et al., "Preparation and properties of LiCo$_y$Mn$_x$Ni$_{1-x-y}$O$_2$ as a chathode for lithium ion batteries," Journal of Power Sources, Aug. 17, 1998, p. 176-181, vol. 90, Elsevier.
Kato, M., "Analysis of X-ray diffraction," Uchida Rokakuho, Apr. 20, 1990, with partial translation.
Abraham, et al., "Surface changes on LiNi$_{0.8}$Co$_{0.2}$O$_2$ particles during testing of high power lithium-ion cells," Electrochemistry Communications, May 2002, p. 620-625, vol. 4, Elsevier.
Lu et al., "Superlattice Ordering of Mn, Ni, and Co in Layered Alkali Transition Metal Oxides with P2, P3, and O3 Structures," Chem. Mater, p. 3583-3590, vol. 12 American Chemical Society.
Terada, Y. et al., "In Situ XAFX Analysis of Li(Mn, M)$_2$ O$_4$(M=Cr, Co, Ni) 5V Cathode Materials for Lithium-Ion Secondary Batteries," Journal of Solid State Chemistry, Feb. 2001, p. 286-291, vol. 156 Issue 2, Academic Press.
Lu, Z. et al., "Layered Li[Ni$_x$Co$_{1-2x}$Mn$_x$]O$_2$ Cathode Materials for Lithium-Ion Batteries," Electrochemical and Solid-State Letters, p. A200-A203, vol. 12, The Electrochemical Society, Inc.
Lu, Z. et al., Layered Cathode Materials Li[Ni$_x$Li$_{(1/3-2x/3)}$]O$_2$ for Lithium-Ion Batteries, Electrochemical and Solid-Sate Letters, 2001, p. A191-A194, vol. 4. The Electrochemical Society, Inc.
Park, H. et al., "Relationship between Chemical Bonding Character and Electrochemical Performance in Nickel-Substituted Lithium Manganese Oxides", J. Phys. Chem., May 3, 2001, p. 4860-4866, vol. 105, American Chemical Society.
Japanese Office Action Issued in Japanese Patent Application No. JP 2003-281871, mailed Apr. 12, 2007.
Japanese Office Action, Issued in Japanese Patent Application No. 2002-303294, dated on Sep. 21, 2007.
Japanese Office Action Issued in Japanese Patent Application No. JP 2002-303294 dated on May 8, 2008.
Japanese Office Action issued in Japanese Patent Application No. 2003-281871 dated on May 15, 2008.
Japanese Office Action issued in Japanese Patent Application No. JP 2002-576035 dated on Feb. 21, 2008.
Japanese Office Action issued in Japanese Patent Application No. JP 2006-226713 dated on Feb. 13, 2008.
Lu et al "Layered Li[Ni CO__Mn } O Cathode materials for Lithium-Ion Batteries" Electrochemical and Solid-State Letters 4 (12) The Electrochemical Society Inc.pp. A200-A203 (2001).
United States Office Action issued in U.S. Appl. No. 10/277,989 dated on Jun. 27, 2008.
Japanese Office Action issued in Japanese Patent Application No. JP 2001-195353 dated on Aug. 28, 2008.
European Search Report issued in European Patent Application No. EP 4256668.7-1227 dated on Aug. 6, 2008.
United States Office Action issued in U.S. Appl. No. 10/277,989, mailed Feb. 25, 2009.
United States Office Action issued in U.S. Appl. No. 11/797,130 dated Jul. 21, 2009.
United States Office Action issued in U.S. Appl. No. 10/362,944 dated Jul 23, 2009.
A. Ueda et al., "Solid-State Redox Reactions of LiNi$_{1/2}$Co$_{1/2}$O$_2$ (R3m) for 4 Volt Secondary Lithium Cells," J. Electrochem. Soc. vol. 141, No. 8, Aug. 1994. pp. 2010-2014.
T. Ohzuku et al., "Synthesis and Characterization of LiMeO$_2$ (Me=Ni, Ni/Co and Co) for 4 Volts Secondary Nonaqueous Lithium Cells," Journal of the Ceramic Society of Japan, Mar. 31, 1992, vol. 100 (No. 3), pp. 346-349.
Japanese Office Action issued in Japanese Patent Application No. JP 2003-377954 dated Sep. 10, 2009.
United States Office Action issued in U.S. Appl. No. 10/277,989 dated Jul. 14, 2009.
United States Office Action issued in U.S. Appl. No. 12/007,617 dated Oct. 7, 2009.

Japanese Office Action issued in Japanese Patent Application No. JP 2006-226713 dated Apr. 8, 2010.
United States Office Action issued in U.S. Appl. No. 11/882,684, mailed Jul. 22, 2010.
United States Office Action issued in U.S. Appl. No. 11/882,684, mailed Sep. 24, 2010.
Japanese Office Action issued in Japanese Patent Application No. 2007-274356, dated Mar. 31, 2011.

Japanese Office Action issued in Japanese Patent Application No. 2007-274357, dated Mar. 31, 2011.
Japanese Office Action issued in Japanese Patent Application No. 2007-273592, dated Mar. 31, 2011.
United States Office Action issued in U.S. Appl. No. 10/277,989, dated Apr. 21, 2011.

* cited by examiner

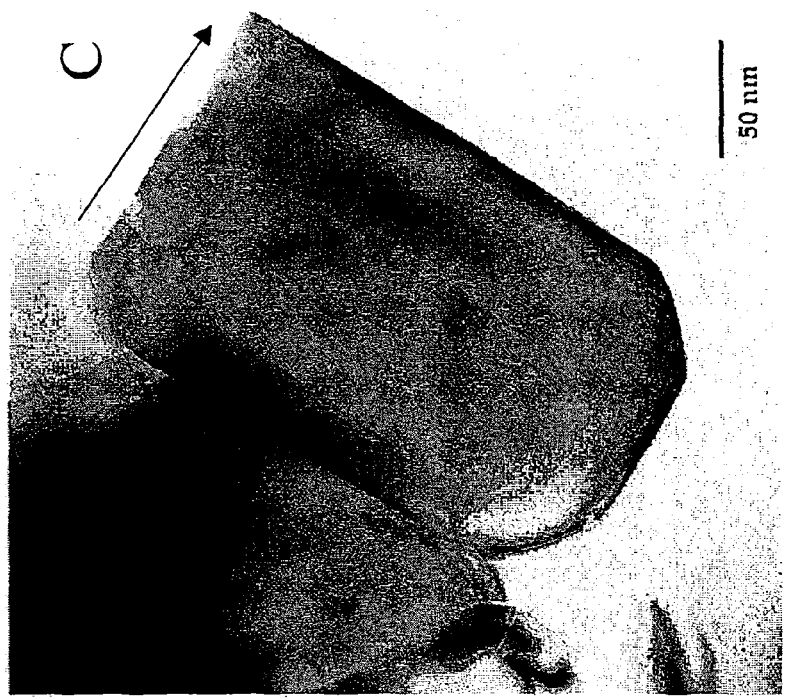
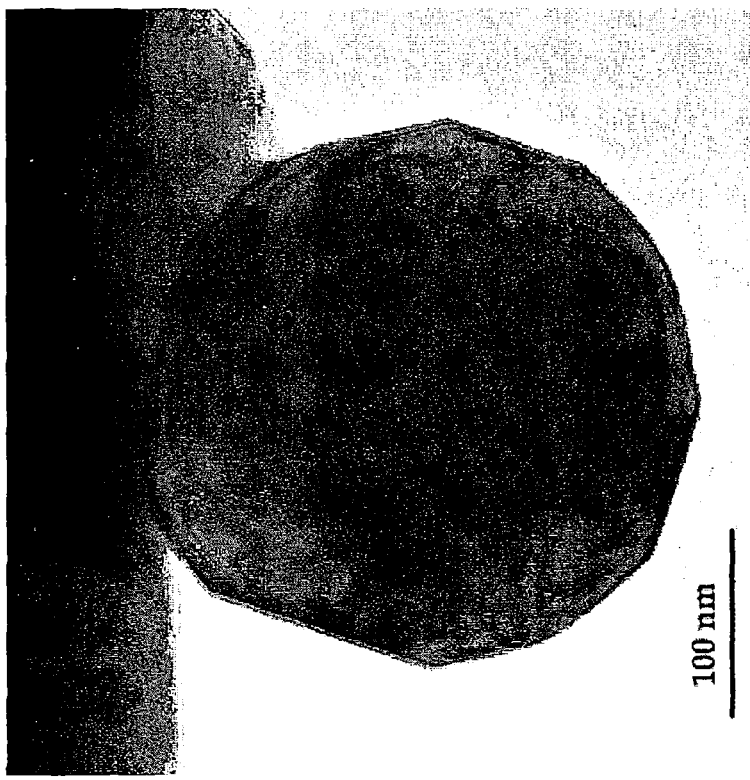
FIG. 3 (a) (b)

FIG. 5(a)
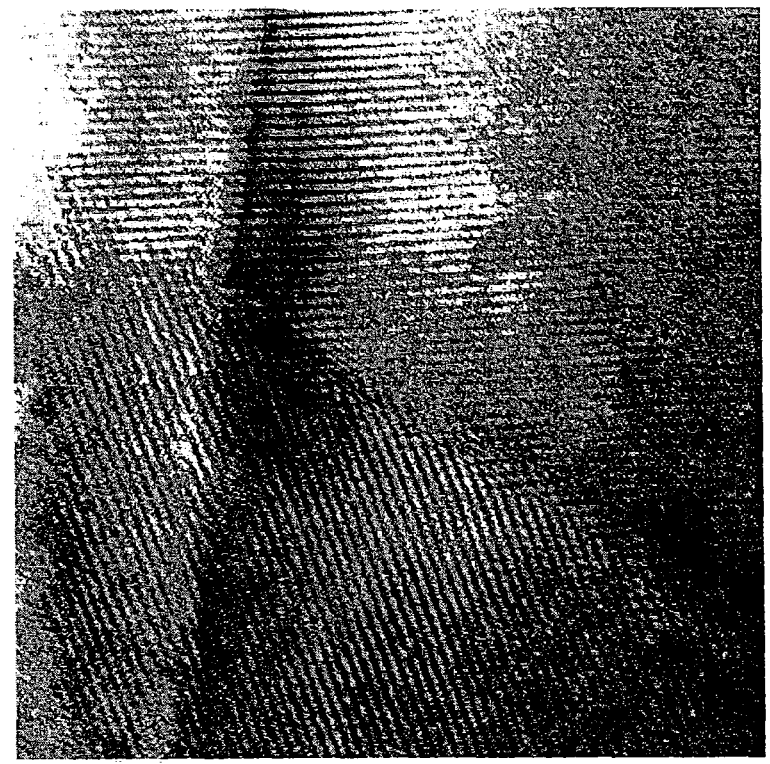
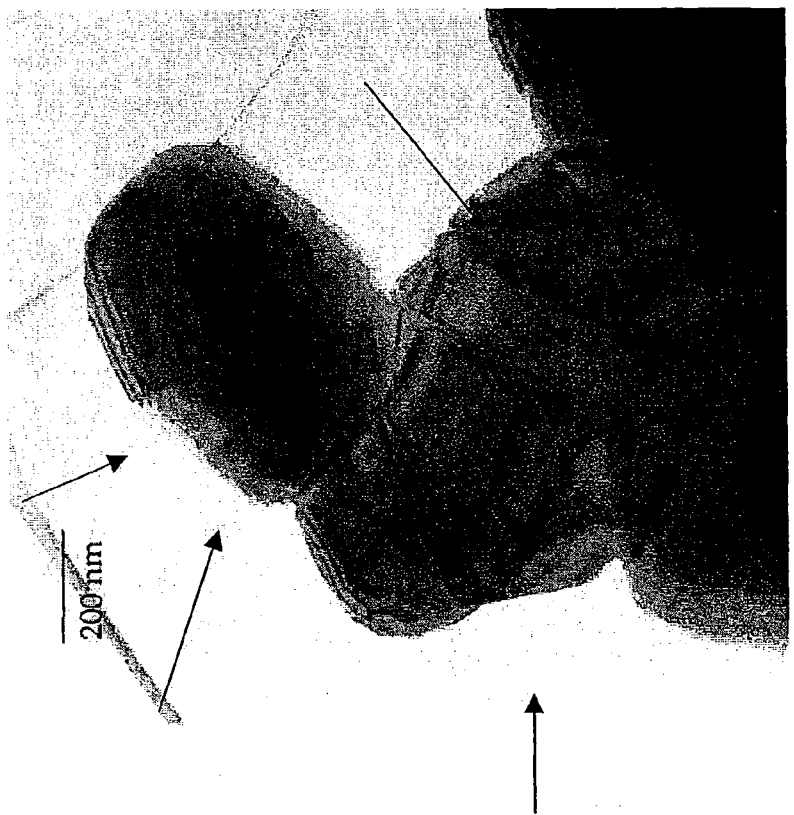

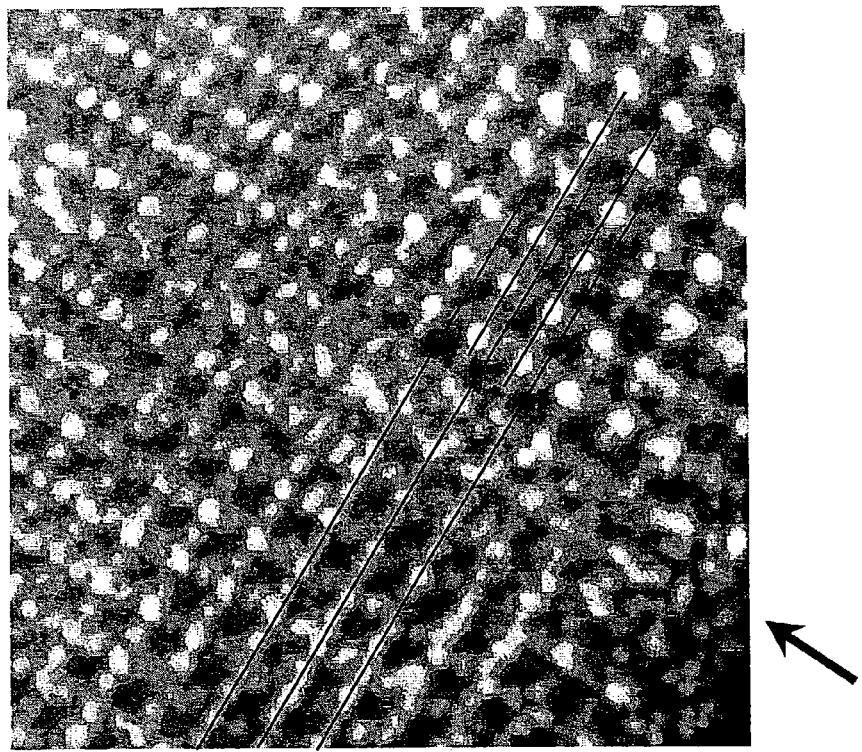
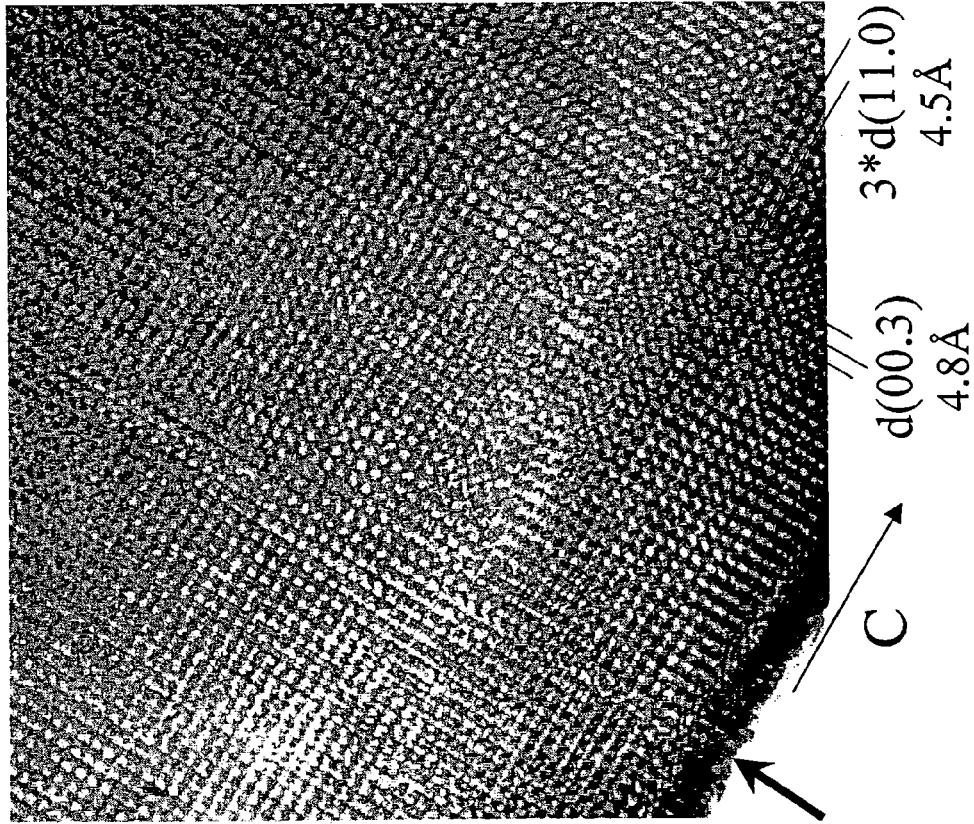
FIG. 8(a)
3*d(11.0)
4.5Å
d(00.3)
4.8Å
C
(b)

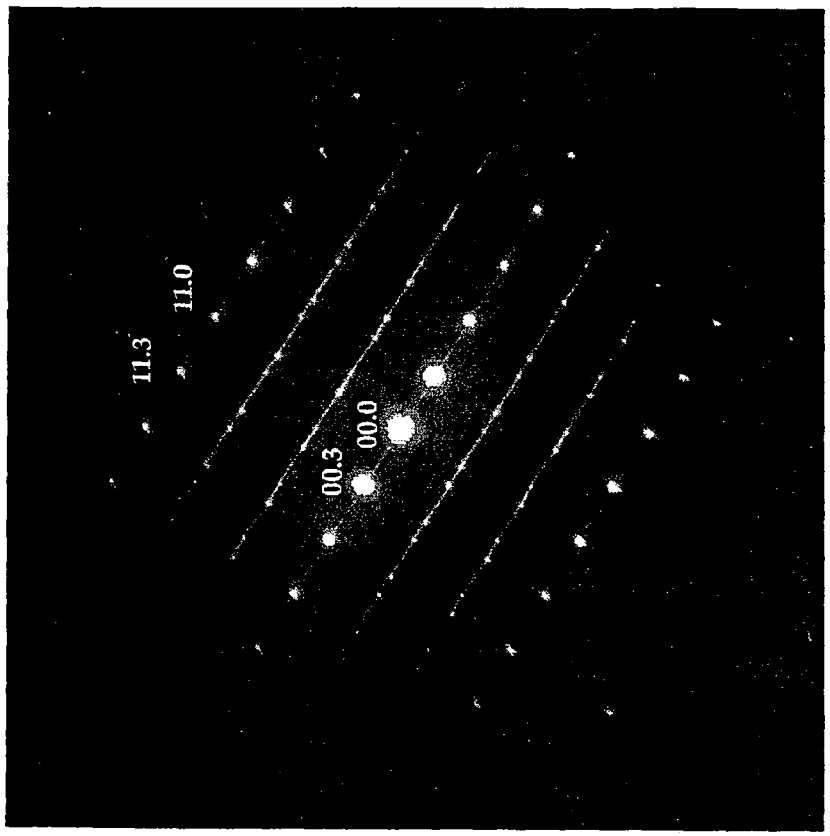
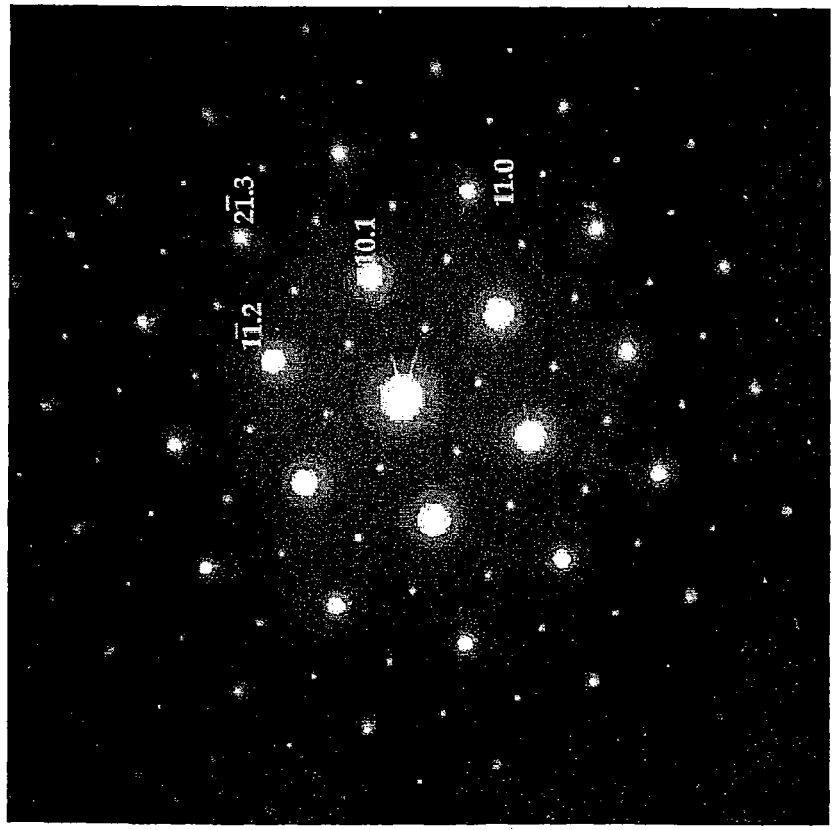
FIG. 10(a)
(b)

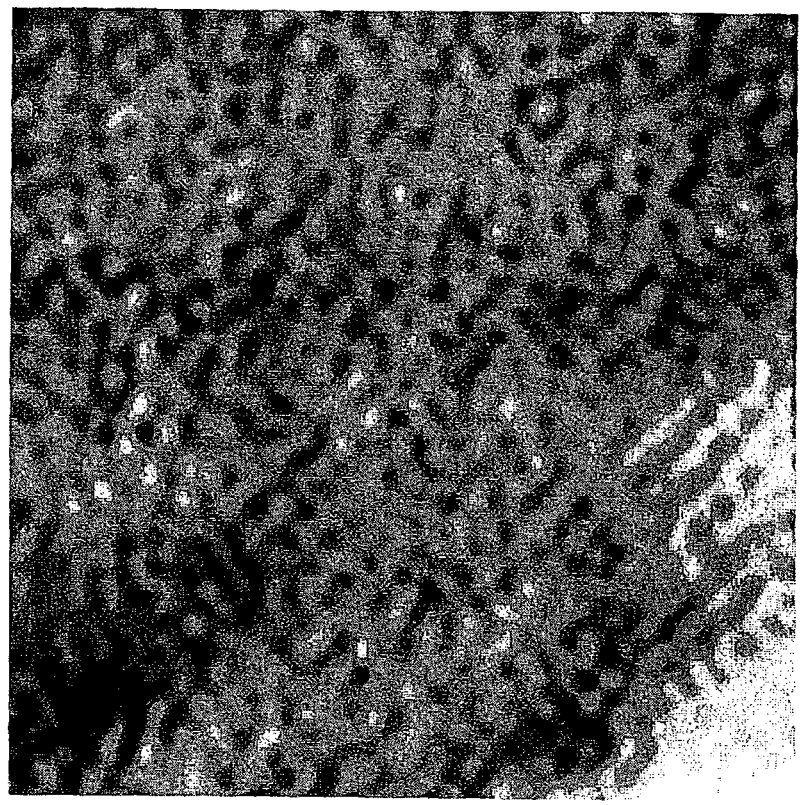
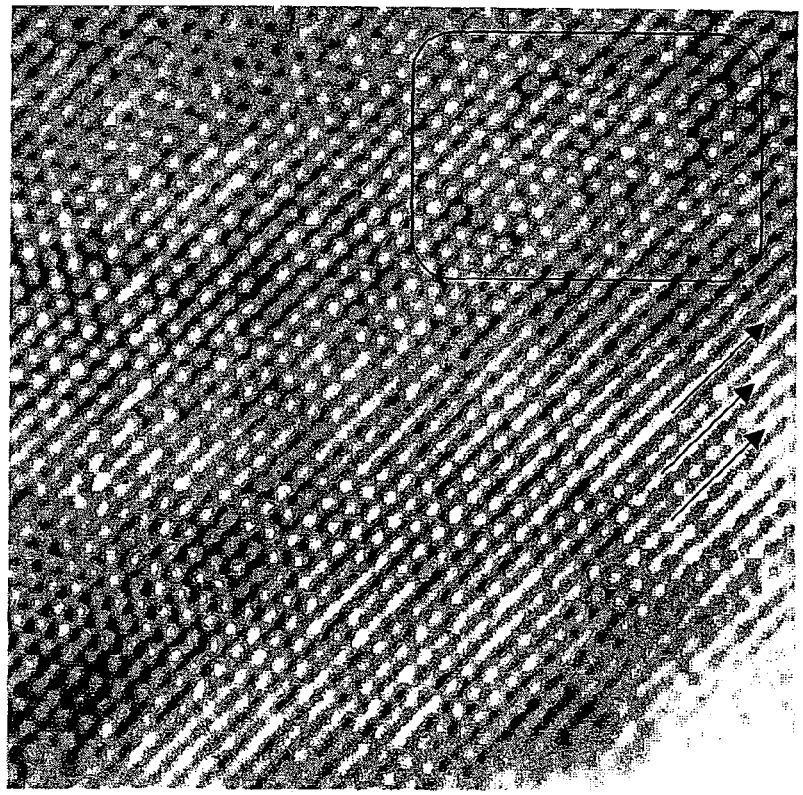
FIG. 11(a) (b)

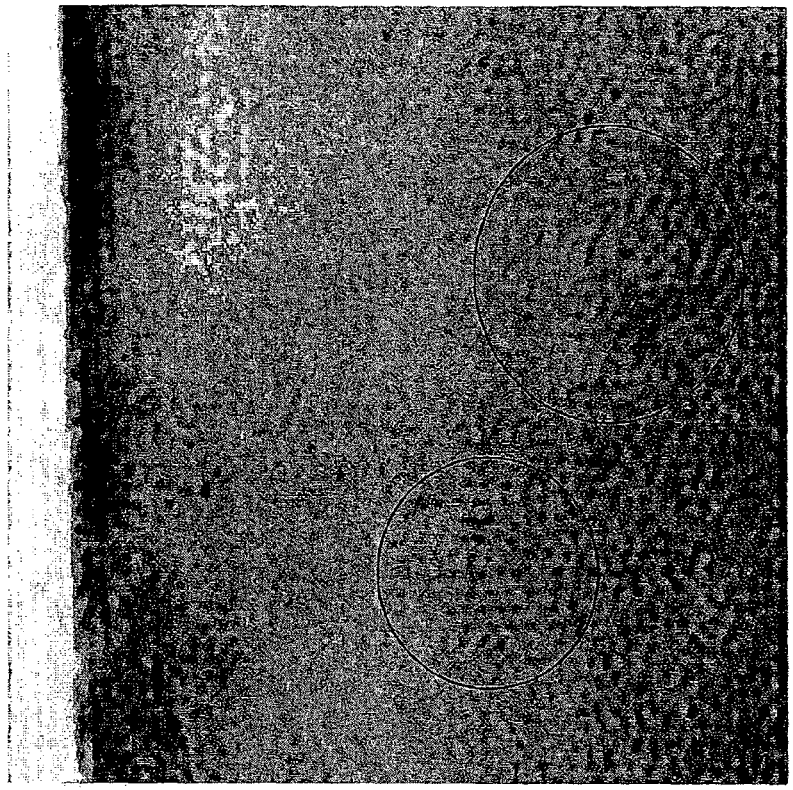
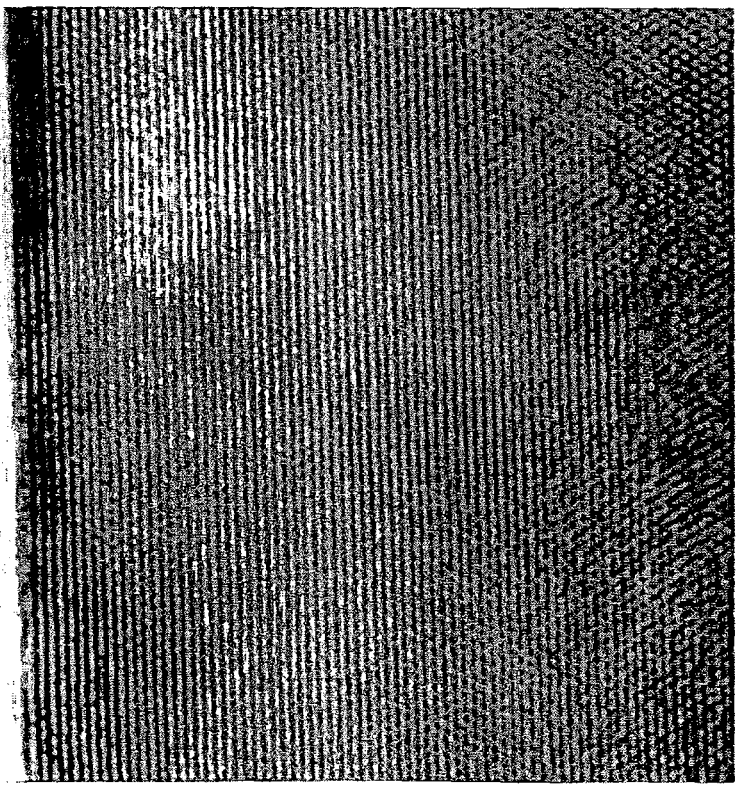
*Ordered regions*
FIG. 12(a)

| No | (hkl) | Integrated Intensity | |
|---|---|---|---|
| | | $LiNiO_2$ | $LiNi_{1/2}Mn_{1/2}O_2$ |
| 1 | (003) | 100 | 84.17 |
| 2 | (101) | 32.98 | 30.59 |
| 3 | (006) | 15.99 | 18.43 |
| 4 | (102) | 74.06 | 100 |
| 5 | (104) | 10.38 | 10.34 |
| 6 | (105) | 10.94 | 13.17 |
| 7 | (107)(009) | 35.53 | 51.91 |
| 8 | (108) | | |
| 9 | (110) | 9.34 | 10.68 |
| 10 | (113) | | |

| No. | (h k l) | $d_{ob}$/Å | $d_{cal}$/Å | $I_{ob}$ | $I_{cal}$ |
|---|---|---|---|---|---|
| 1 | (0 0 3) | 4.75 | 4.75 | 100.00 | 99.80 |
| 2 | (1 0 1) | 2.44 | 2.44 | 39.36 | 39.57 |
| 3 | (0 0 6) | 2.38 | 2.37 | | |
| 4 | (1 0 2) | | 2.34 | 15.88 | 20.86 |
| 5 | (1 0 4) | 2.04 | 2.03 | 87.13 | 71.47 |
| 6 | (1 0 5) | 1.87 | 1.87 | 11.73 | 13.57 |
| 7 | (1 0 7) | 1.58 | 1.58 | 14.43 | 17.53 |
| 8 | (0 0 9) | | 1.57 | | |
| 9 | (1 0 8) | 1.45 | 1.45 | 39.19 | 41.16 |
| 10 | (1 1 0) | | 1.43 | | |
| 11 | (1 1 3) | 1.37 | 1.37 | 13.26 | 14.26 |
| 12 | (2 0 4) | 1.17 | 1.17 | 8.82 | 8.66 |
| 13 | (2 0 8) | 1.02 | 1.02 | 5.69 | 6.03 |

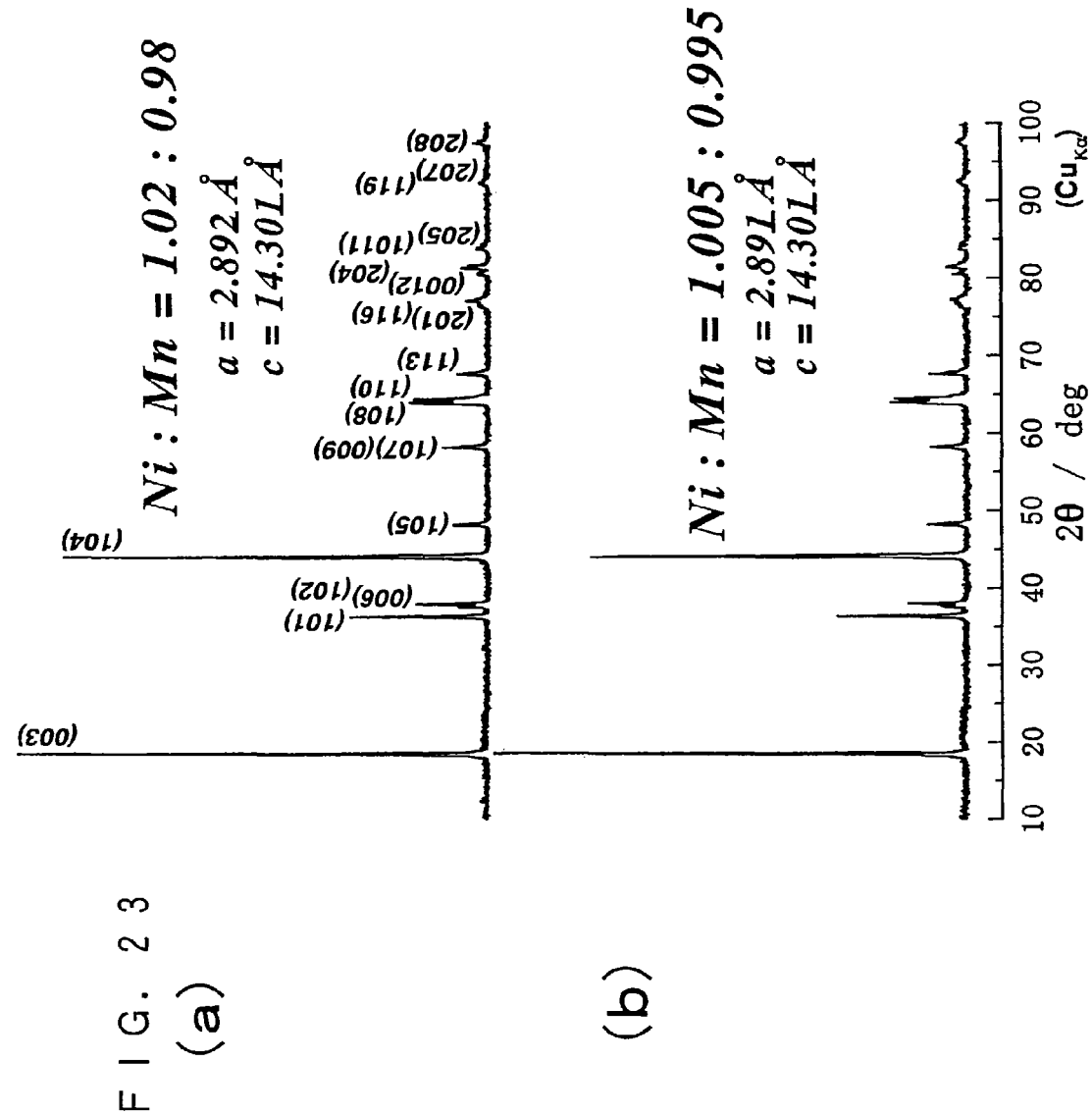
FIG. 23 (a) (b)

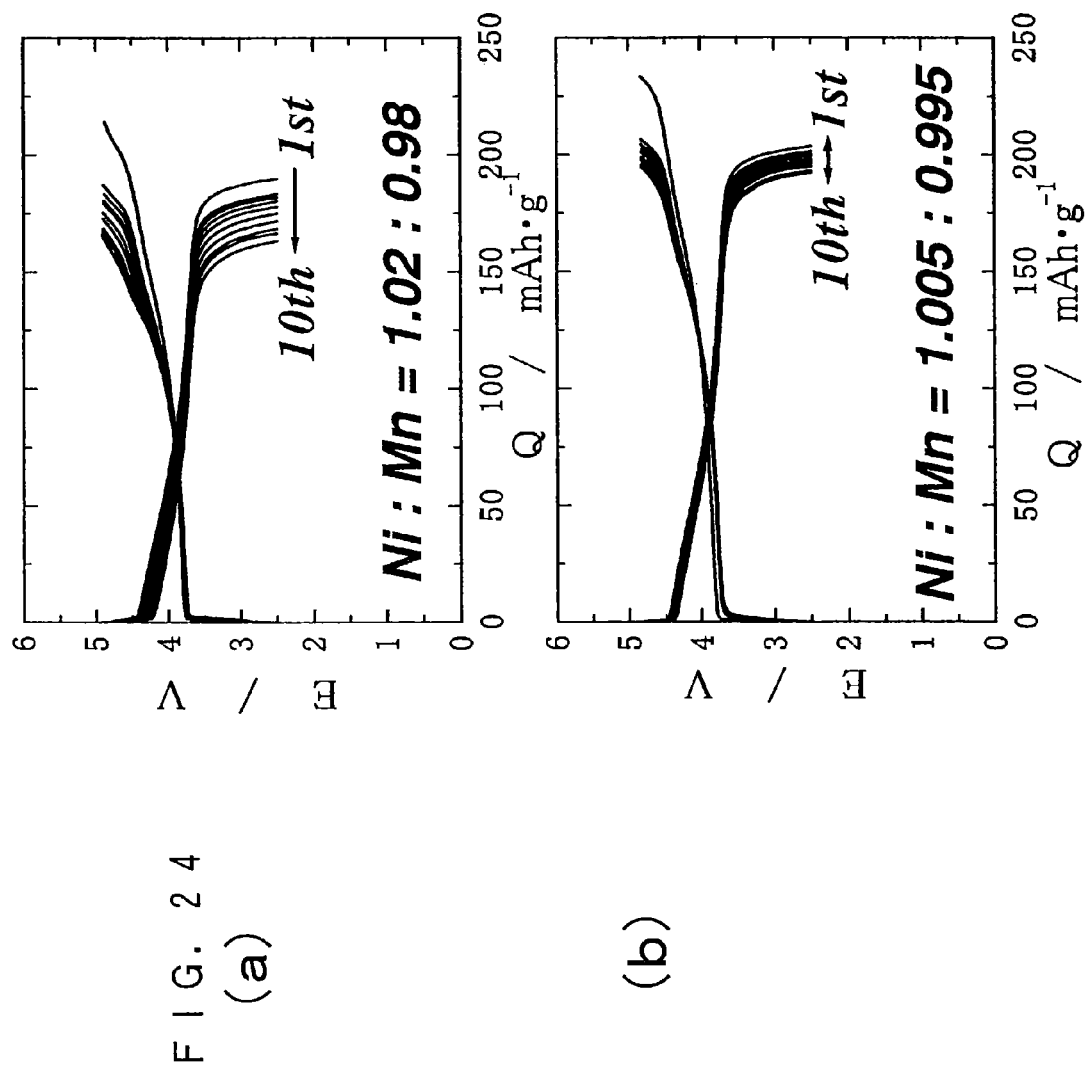
F I G. 2 4
(a)
(b)

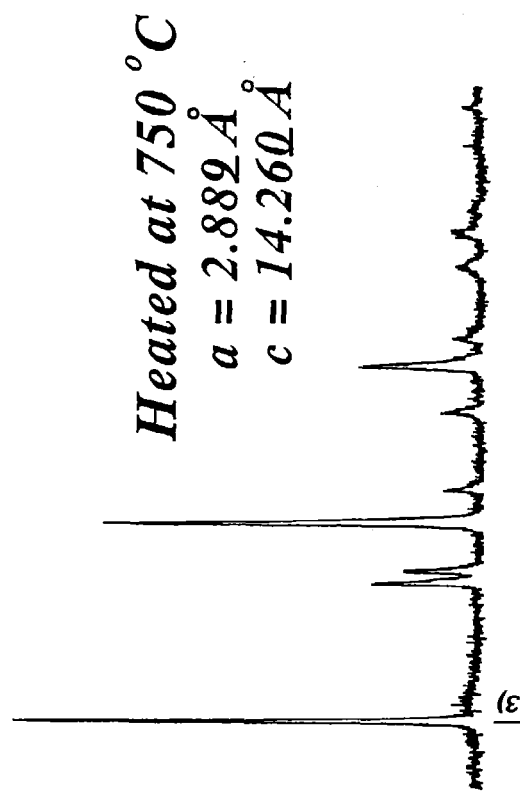
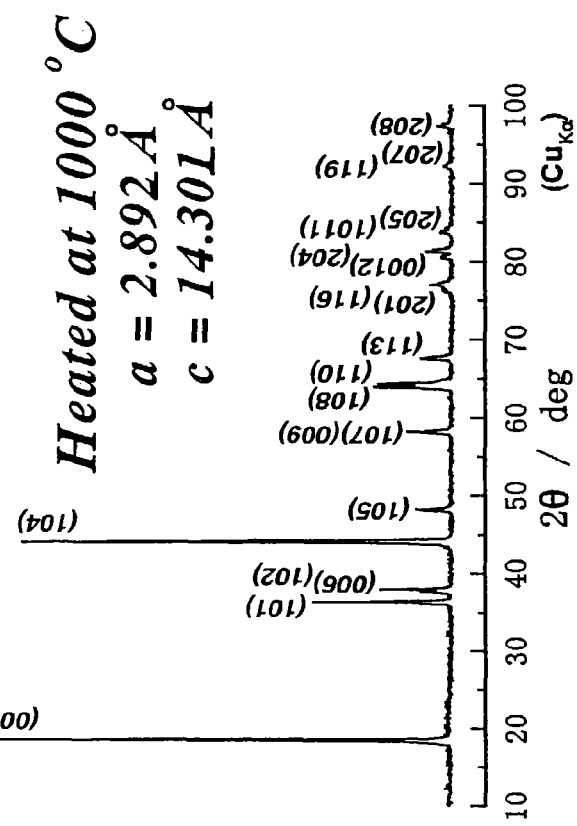
FIG. 25
(a)
(b)

POSITIVE ELECTRODE ACTIVE MATERIAL AND NON-AQUEOUS ELECTROLYTE SECONDARY BATTERY CONTAINING THE SAME

BACKGROUND OF THE INVENTION

The present invention relates to a positive electrode active material, particularly to a positive electrode active material for a non-aqueous electrolyte battery. The present invention further relates to a high-capacity and low-cost non-aqueous electrolyte secondary battery having a positive electrode containing a specific positive electrode active material.

In recent years, with the widespread use of cordless and portable AV appliances, personal computers and the like, the need has been increasing for compact, light weight, and high energy density batteries as power sources for driving those appliances. In particular, lithium secondary batteries, as having high energy density, are expected to be dominant batteries in the next generation, and the potential market thereof is very large. In most of the lithium secondary batteries currently available on the market, $LiCoO_2$ having a high voltage of 4 V is used as the positive electrode active material, but $LiCoO_2$ is costly because Co is expensive. Under such circumstances, research has been progressing to investigate various positive electrode active materials as substitutes for $LiCoO_2$. Among them, a lithium-containing transition metal oxide has been wholeheartedly researched: $LiNi_aCo_bO_2$ (a+b≈1) is promising, and it seems that $LiMn_2O_4$ having a spinel structure has already been commercialized.

In addition, nickel and manganese as substitute materials for expensive cobalt have also been under vigorous research. $LiNiO_2$ having a layered structure, for example, is expected to have a large discharge capacity, but the crystal structure of $LiNiO_2$ changes during charging/discharging, causing a great deal of deterioration thereof. In view of this, it is proposed to add to $LiNiO_2$ an element that can stabilize the crystal structure during charging/discharging and thus prevent the deterioration. As the additional element, specifically, there are exemplified cobalt, manganese, titanium and aluminum. Here, Table 1 lists composite oxides of Ni and Mn used as a positive electrode active material for a lithium secondary battery in prior art examples.

TABLE 1

| Prior art examples | Composition of composite oxide disclosed |
| --- | --- |
| U.S. Pat. No. 5,393,622 | $Li_yNi_{1-x}Mn_xO_2$, where $0 \leq x \leq 0.3$, $0 \leq y \leq 1.3$ |
| U.S. Pat. No. 5,370,948 | $LiNi_{1-x}Mn_xO_2$, where $0.005 \leq x \leq 0.45$ |
| U.S. Pat. No. 5,264,201 | $Li_xNi_{2-x-y}Mn_yO_2$, where $0.8 \leq x \leq 1.0$, $y \leq 0.2$ |
| U.S. Pat. No. 5,629,110 | $LiNi_{1-x}Mn_xO_2$, where $0 < x \leq 0.2$, $y \leq 0.2$ |
| JP-A-8-171910 | $LiNi_xMn_{1-x}O_2$, where $0.7 \leq x \leq 0.95$ |
| JP-A-9-129230 | $LiNi_xMn_{1-x}O_2$, where M is at least one of Co, Mn, Cr, Fe, V and Al, $1 > x \geq 0.5$, preferably $x = 0.15$ |
| JP-A-10-69910 | $Li_{y-x1}Ni_{1-x2}Mn_xO_2$, where M is Co, Al, Fe, Mg or Mn, $0 < x_2 \leq 0.5$, $0 \leq x_1 < 0.2$, $x = x_1 + x_2$, $0.9 \leq y \leq 1.3$ |

All of the composite oxides disclosed in the above U.S. Patents and Japanese Laid-Open Patent Publications are intended to improve the electrochemical characteristics such as the cycle characteristic of $LiNiO_2$ by adding a trace amount of an element to $LiNiO_2$, while retaining the characteristic properties of $LiNiO_2$. Accordingly, in the active material obtained after the addition, the amount of Ni is always larger than that of Mn, and the preferable proportion is considered to be Ni:Mn=0.8:0.2. As an example of a material having a proportion with a highest amount of Mn, Ni:Mn=0.55:0.45 is disclosed. However, in any of these prior art examples, it is difficult to obtain a composite oxide having a single-phase crystal structure since $LiNiO_2$ is separated from $LiMnO_2$. This is because nickel and manganese are oxidized in different areas during coprecipitation, and a homogenous oxide is not likely to be formed.

As described above, as a substitute material for the currently commercialized $LiCoO_2$ having a high voltage of 4 V, $LiNiO_2$ and $LiMnO_2$ as high-capacity and low-cost positive electrode active materials having a layered structure like $LiCoO_2$ have been researched and developed. However, the discharge curve of $LiNiO_2$ is not flat, and the cycle life is short. In addition, the heat resistance is low, and hence the use of $LiNiO_2$ as the substitute material for $LiCoO_2$ would involve a serious problem. In view of this, improvements have been attempted by adding various elements to $LiNiO_2$, but satisfactory results have not been obtained yet. Further, since a voltage of only 3 V can be obtained with $LiMnO_2$, $LiMn_2O_4$ which does not have a layered structure but has a spinel structure with low-capacity is beginning to be researched. Namely, required has been a positive electrode active material which has a voltage of 4V, as high as $LiCoO_2$, exhibits a flat discharge curve, and whose capacity is higher and cost is lower than $LiCoO_2$.

As opposed to this, Japanese Patent Application No. 2000-227858 does not propose a technique for improving the inherent characteristics of $LiNiO_2$ or those of $LiMnO_2$ by adding a new element thereto, but proposes a positive electrode active material composed of a nickel manganese composite oxide which represents a new function by dispersing a nickel compound and a manganese compound uniformly at the atomic level to form a solid solution. That is to say, the prior art examples propose plenty of additional elements, but not technically clarify which elements are specifically preferred, whereas the above application proposes the positive electrode active material which can represent a new function by combining nickel and manganese at about the same ratio.

The following shows the prior art examples disclosing the crystal structure and particle morphology of composite oxides.

TABLE 2

| Prior art examples | Morphology of composite oxide disclosed |
| --- | --- |
| JP-A-2000-133262 | $Li_aNi_bCO_cMn_dO_2$ ($0.1 \leq a \leq 1.2$, $0.40 \leq b < 1.15$, $0 < c < 0.60$, $0 < d < 0.60$, $1.00 \leq b + c + d \leq 1.15$, $0 < c + d \leq 0.60$) Content "e" of transition metal in Li layer is $0.006 \leq e \leq 0.150$ $Li_aNi_bCO_cMn_dO_2$ Intensity ratio R is $0.510 \leq R \leq 0.700$, where "intensity ratio R" is the ratio of the total peak intensity of (012) and (006) planes to the peak intensity of (101) plane in the X-ray diffraction pattern using CuK α radiation |
| Japanese Patent No. 3047693 (JP-A-7-37576) | $LiNi_{(1-x)}Mn_xO_2$ ($0 < x < 0.3$) A plurality of minute single crystal grains are aggregated to form secondary particles with spherical, almost spherical or elliptical shape. |
| Japanese Patent No. 3232984 (JP-A-9-129230) | $LiNi_xMn_{1-x}O_2$ (M is one or more selected from Co, Mn, Cr, Fe, V and Al, $1 > x \geq 0.5$) Mixture comprising minute crystal particles with a unidirectional size of 0.1 to 2 μm measured by SEM and secondary particles with a unidirectional size of 2 to 20 μm comprising a plurality of the minute crystal particles |

TABLE 2-continued

| Prior art examples | Morphology of composite oxide disclosed |
| --- | --- |
| Japanese Patent No. 3110728 (JP-A-2000-323123) | Porous spherical secondary particles comprising a Li composite oxide composed mainly of Li and one or more elements selected from the group consisting of Co, Ni and Mn<br>Mean micropore size obtained from a micropore distribution measured by a mercury penetration method is 0.1 to 1 μm.<br>Total volume of micropore with a size of 0.01 to 1 μm is not less than 0.01 cm$^3$/g.<br>Mean particle size is 4 to 20 μm and tap density is not less than 1.8 g/cc.<br>Inflection point of volume decreasing rate by Cooper plot method is not less than 500 kg/cm$^2$. |

TABLE 3

| Prior art examples | Morphology of composite oxide disclosed |
| --- | --- |
| Japanese Patent No. 3130813 (JP-A-10-69910) | $Li_{y-x1}Ni_{1-x2}M_xO_2$, where M is one of Al, Fe, Co, Mn and Mg, $x = x_1 + x_2$, $0.9 \leq y \leq 1.3$; $0 < x \leq 0.2$, $x_1 = 0$, $x_2 = x$ in the case of M being Al or Fe; $0 < x \leq 0.5$, $x_1 = 0$, $x_2 = x$ in the case of M being Co or Mn; $0 < x \leq 0.2$, $0 < x_1 < 0.2$, $0 < x_2 < 0.2$ in the case of M being Mg<br>Diffraction peak ratio (003)/(004) is not less than 1.2 and the ratio (006)/(101) is not more than 0.13.<br>BET surface area is 0.1 to 2 m$^2$/g<br>Percentage of $Ni^{3+}$ to whole Ni is not less than 99 wt %.<br>Mean particle size D is 5 to 100 μm.<br>10% of particles has a size of not less than 0.5 D and 90% has that of not more than 2 D in particle size distribution.<br>According to SEM, spherical secondary particles have a rough surface, primary particles have a length of 0.2 to 3.0 μm, and mean particle length thereof is 0.3 to 2.0 μm. |
| Japanese Patent No. 3233352 (JP-A-2000-195514) | LiNi-based composite oxide<br>$0.75 \leq FWHM(003)/FWHM(104) \leq 0.9$<br>(FWHM is half peak width of powdered X-ray diffraction using CuK α radiation.)<br>$0.25 \leq I(104)/I(003) \leq 0.9$ (I is integrated intensity) |

As described above, those prior art examples describe the particle size, micropore, specific surface area, primary particle, secondary particle and aggregation of primary or secondary particle of composite oxide particles constituting the positive electrode active material, but they do not at all disclose the details of grains and crystal structure within a primary particle, which is the primary object of the present invention. In other words, there has been no detailed study on the grain and crystal structure of the primary particles of the composite oxide constituting the positive electrode active material.

In view of the above, the present invention is intended to provide an active material comprising a lithium-containing composite oxide with high capacity, excellent rate capacity and longer cycle life by adding nickel and manganese elements with a controlled composition to form solid solution, and controlling the crystal structure and superlattice structure as well as the grain arrangement and crystal domain within the primary particles of the oxide at the same time.

BRIEF SUMMARY OF THE INVENTION

The present invention relates to a positive electrode active material comprising a lithium-containing composite oxide including at least nickel and manganese elements, wherein the positive electrode active material comprises primary particles of the composite oxide having a twining portion.

Preferably, the composite oxide has a layered crystal structure and the arrangement of oxygen atoms is a cubic close-packed structure.

The composite oxide preferably has a defected portion or disordered portion in the crystal lattice thereof.

The composite oxide preferably has a superlattice arrangement of a $[\sqrt{3} \times \sqrt{3}]$ R30° when assigned as R3-m.

The composite oxide preferably contains nickel and manganese elements substantially at the same ratio.

The composite oxide preferably has an integrated intensity ratio (003)/(004) of the X-ray diffraction peak assigned as R3-m which satisfies the equation:

$$(003)/(104) \leq 1.2.$$

The composite oxide preferably has an extra spot or streak substantially in every electron beam diffraction pattern indexed when assigned as R3-m.

The primary particles preferably have at least one of spherical shape and rectangular parallelepiped hexahedron shape.

The primary particles preferably have a particle size of 0.1 to 2 μm and the positive electrode active material further comprises secondary particles of the composite oxide with a particle size of 2 to 20 μm.

The composite oxide is preferably represented by the formula (1): $Li_{1+y}[M_x(Ni_\delta Mn_\gamma)_{1-x}]O_2$, where $-0.05 < y < 0.05$, M is one or more elements other than nickel and manganese, $-0.1 \leq x \leq 0.3$, $\delta = 0.5 \pm 0.1$, $\delta = 0.5 \pm 0.1$, and $-0.1 \leq x \leq -0.5$ in the case of M being cobalt.

The M is preferably trivalent in the oxidized state.

The M preferably comprises at least one selected from the group consisting of aluminum and cobalt.

The M preferably comprises at least one selected from the group consisting of magnesium, calcium, strontium, zirconium, yttrium and ytterbium magnesium.

The present invention further relates to a non-aqueous electrolyte secondary battery comprising: a negative electrode containing, as a negative electrode active material, a material capable of absorbing and desorbing lithium ions and/or metal lithium; a positive electrode containing the aforesaid positive electrode active material; and an electrolyte.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 3 is TEM images of typical primary particles of $LiNi_{1/2}Mn_{1/2}O_2$.

FIG. 5 is TEM images showing the grain structure within a primary particle of $LiNi_{1/3}Mn_{1/3}Co_{1/3}O_2$.

FIG. 8 is TEM images showing a defect in the crystal lattice of $LiNi_{1/2}Mn_{1/2}O_2$.

FIG. 10 is electron beam diffraction images of $LiNi_{1/2}Mn_{1/2}O_2$.

FIG. 11 is TEM images analyzed by Fourier transformation technique in order to find a superlattice pattern in a short range.

FIG. 12 is TEM images analyzed by Fourier transformation technique in order to find a superlattice pattern in a short range.

FIG. 14 is a table showing the peak intensities of $LiNiO_2$ and $LiNi_{1/2}Mn_{1/2}O_2$ of FIG. 13.

FIG. 16 is a table showing the Miller indices, "d" values and observed and calculated intensity ratios of X-ray diffraction patterns of FIG. 15.

FIG. 23 is X-ray diffraction patterns of materials containing nickel and manganese at a composition ratio of slightly different from 1:1.

FIG. 24 is graphs showing a charge/discharge curve of the materials with a composition ratio shown in FIG. 23.

FIG. 25 is X-ray diffraction patterns of $LiNi_{1/2}Mn_{1/2}O_2$ at different baking temperatures.

DETAILED DESCRIPTION OF THE INVENTION

Figure 1:
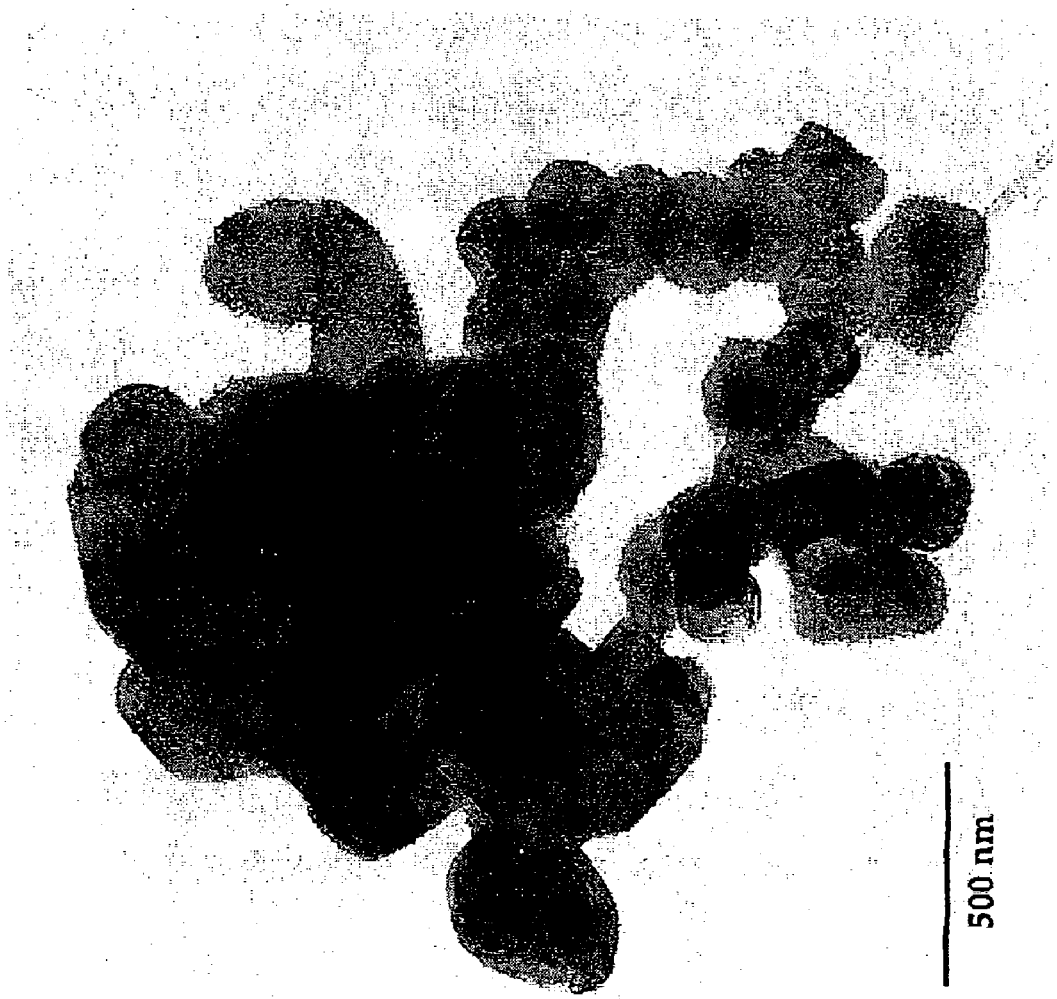
FIG. 1 is a TEM image of $LiNi_{1/2}Mn_{1/2}O_2$ as a lithium-containing composite oxide of the present invention.

The present invention relates to a positive electrode active material comprising a lithium-containing composite oxide including at least nickel and manganese elements characterized in that the positive electrode active material comprises primary particles of the composite oxide with a twining portion. Herein, "twining portion" refers to the interface between a grain and a domain.

The present invention is further characterized in that the composite oxide has a layered crystal structure and the arrangement of oxygen atoms is a cubic close-packed structure and that the composite oxide has a defected portion or a disordered portion in the primary particle or grain. It is to be noted that sometimes "positive electrode active material" is referred to simply as "material" in this specification.

The present inventors conducted extensive research and development on a lithium-containing composite oxide containing nickel and manganese elements, and found a positive electrode active material for a non-aqueous electrolyte secondary battery which exhibits excellent function. They further found, in addition to conventional techniques to control the composition and crystal structure of the lithium-containing composite oxide, that controlling the particle morphology thereof gives a positive electrode active material having more excellent function. As a result, they have completed the present invention.

Regarding the composition, the lithium-containing composite oxide should contain, as a premise, nickel and manganese at the same time, and it is important that the ratio thereof be 1:1 (the same ratio). Further, these elements interfere with each other in their electron state in the oxide, and exhibit a superlattice behavior. It is considered to be important that nickel and manganese elements are uniformly dispersed at nano level in the crystals of the oxide. It is also important, from the viewpoint of crystal structure, that the lithium-containing composite oxide has a layered structure and that the arrangement of oxygen atoms is a cubic close-packed structure with ABCABC stacking. Although the X-ray diffraction pattern of the composite oxide reveals that it has a layered structure, it is characterized in that the composite oxide has an integrated intensity ratio (003)/(004) of the X-ray diffraction peak when assigned as R3-m which satisfies the equation: $(003)/(104) \leqq 1.2$.

In terms of the morphology, the present inventors advanced their techniques to attain a more excellent active material by controlling the grain and grain boundary of primary particles to have a preferred morphology.

In addition to that, the present inventors also found that adding different kinds of elements to the lithium-containing composite oxide provides various added functions. Doping the positive electrode active material with aluminum element, for example, enables the heat resistance of the crystal particles to be improved, the electric potential to be slightly increased, and the charge/discharge curve to be flat. Doping the positive electrode active material with cobalt can improve the polarization characteristics. Furthermore, doping the positive electrode active material with magnesium can enhance the electronic conductivity of the crystal particles. Moreover, by using different kinds of elements, the amount of gas generated due to the reaction between the surface of the crystal particles and an electrolyte can be increased or decreased.

In the following, the present invention is described with reference to representative examples using cobalt, aluminum or magnesium as the third element, but it is to be understood that those skilled in the art will easily conceive that other functions can be added thereto and can carry it out.

(1) Particle Morphology and Crystal Structure of Active Material of the Present Invention The following describes the present invention using $LiNi_{1/2}Mn_{1/2}O_2$ and $LiNi_{1/3}Mn_{1/3}Co_{1/3}O_2$ as representative examples.

Figure 2:
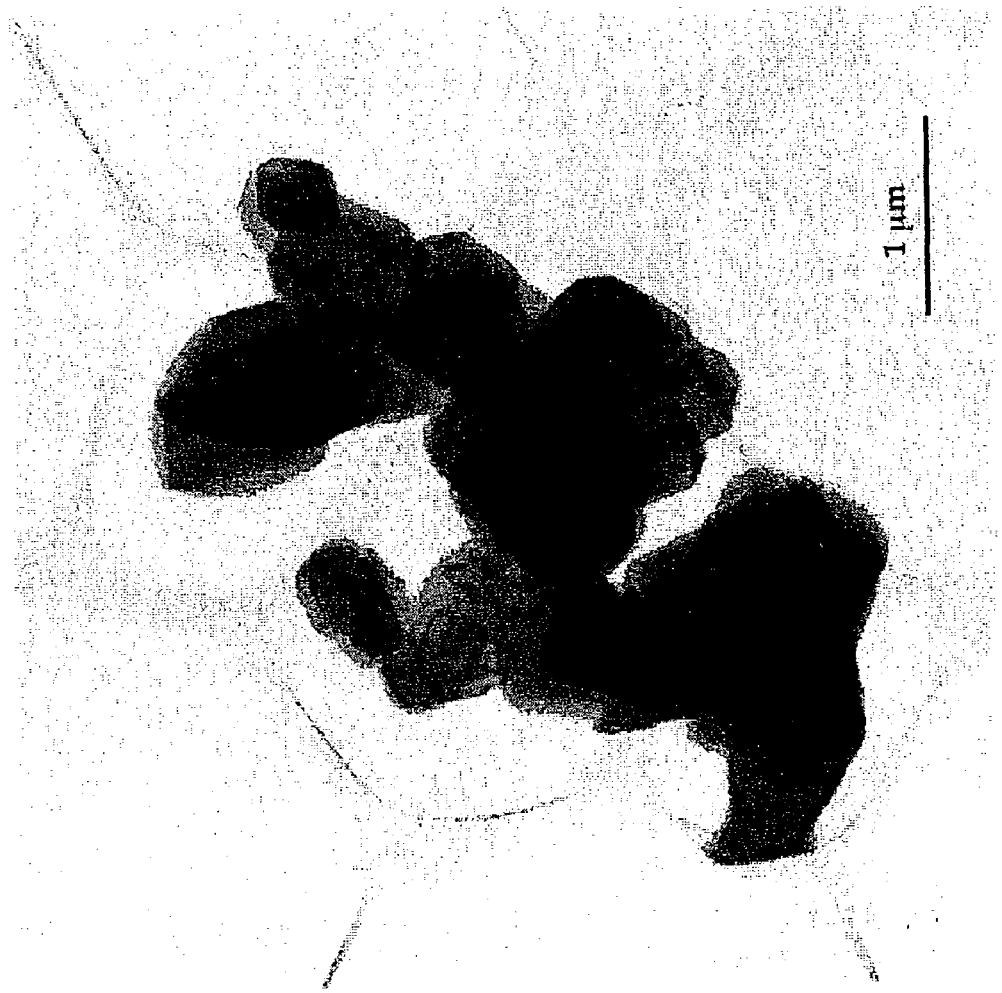
FIG. 2 is a TEM image of $LiNi_{1/3}Mn_{1/3}Co_{1/3}O_2$ as a lithium-containing composite oxide of the present invention.

FIGS. 1 and 2 show TEM (transmission electron microscope) images of lithium-containing composite oxides of the present invention. FIG. 1 is a TEM image of $LiNi_{1/2}Mn_{1/2}O_2$, and FIG. 2 is a TEM image of $LiNi_{1/3}Mn_{1/3}Co_{1/3}O_2$. These images indicate that the primary particles of these composite oxides have a particle size of 100 to 500 nm and a particle size of 200 to 1000 nm, respectively. The images only show a representative portion, but almost all particles observed had a particle size within this range. Accordingly, it is surmised that the active material actually comprises primary particles of the composite oxide having a particle size of 100 to 2000 nm.

Figure 4:
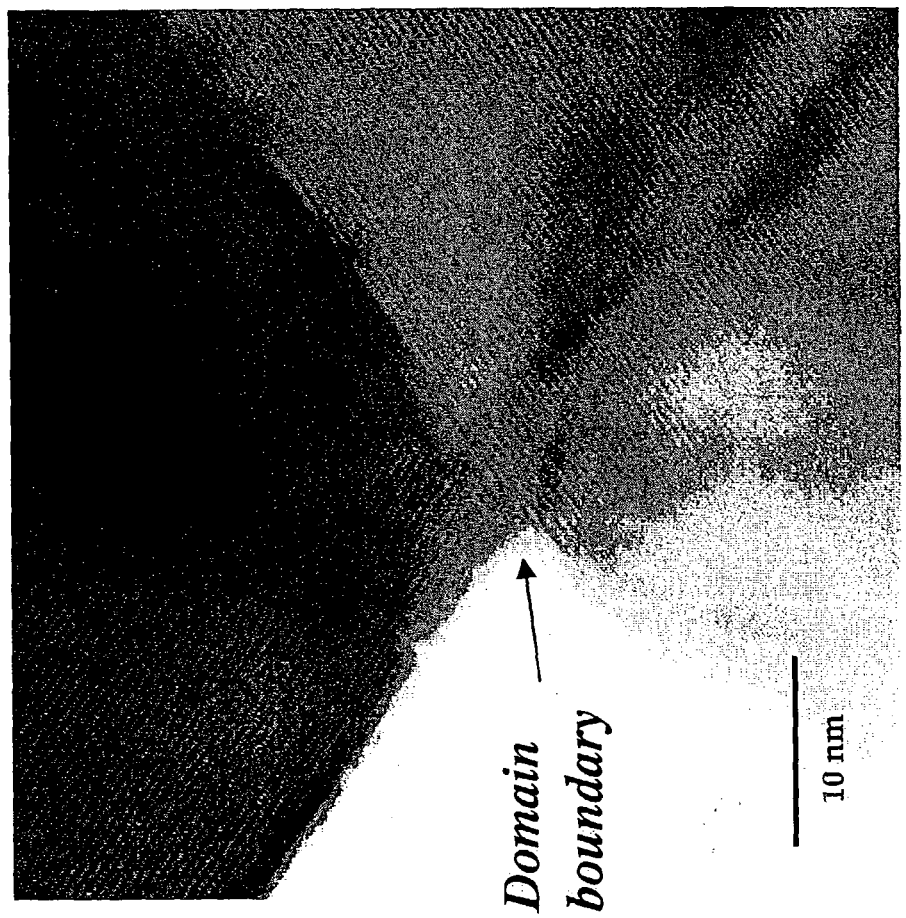
FIG. 4 is a TEM image showing the crystal domain structure within a primary particle of $LiNi_{1/2}Mn_{1/2}O_2$.

Now, a description is given on grains within the primary particle. FIG. 3 is TEM images of a typical primary particle of $LiNi_{1/2}Mn_{1/2}O_2$. As is evident from the images, the particle of the composite oxide in accordance with the present invention have either a spherical (a) or rectangular parallelepiped hexahedron shape (b). Moreover, FIG. 4 is a TEM image showing the morphology of a crystal domain structure within the primary particle of $LiNi_{1/2}Mn_{1/2}O_2$. This image illustrates that a twining portion exists within the particle. Herein, "twining portion" means the interface between crystal domains within a primary particle. It is noted that twinning is a term to present a noparallel intergrowth of separate crystals related by a symmetry.

As described above, the composite oxide constituting the positive electrode active material of the present invention gives an excellent effect by satisfying the following two points: (i) most of the primary particles have either a spherical or rectangular parallelepiped hexahedron shape; (ii) a twining portion exists within the primary particle.

In the positive electrode active material with a layered structure currently used, such as $LiCoO_2$, charge/discharge reaction occurs by absorption/desorption of lithium ions. It is presumed that lithium ions enter and leave in a direction vertical to layers, that is, in the c-axis direction. Accordingly, in such material with particles having a hexagonal prism shape, it is surmised that lithium ions enter and leave not from the whole surface of the particle, but only in a direction vertical to layers. In addition, there has been no detailed study on the direction of grains within particle of such conventional material, and there is no description on that in prior art examples.

Although the positive electrode active material in accordance with the present invention has a layered structure similar to $LiCoO_2$, lithium ions can enter and leave in every direction of the particle by satisfying either of the above-mentioned two points (i.e. (i) and (ii)) or both thereof. This greatly reduces the polarization resistance involved in mass transport of lithium ions. As a result, it is possible to realize an active material with excellent rate capacity.

FIG. 5 is TEM images showing the morphology of grains within the primary particle of $LiNi_{1/3}Mn_{1/3}Co_{1/3}O_2$. A grain morphology similar to that of $LiNi_{1/2}Mn_{1/2}O_2$ is observed in FIG. 5 (a), and many twining portions are observed in FIG. 5 (b).

Figure 6:
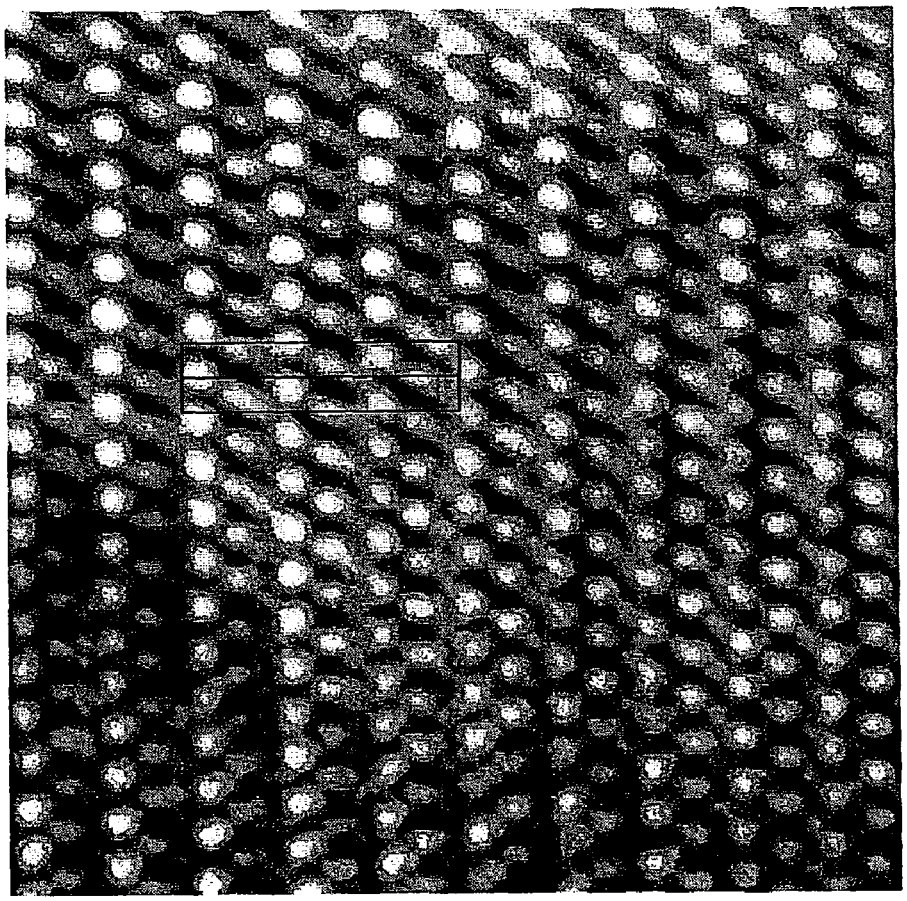
FIG. 6 is a TEM image showing the oxygen arrangement of $LiNi_{1/2}Mn_{1/2}O_2$.
Figure 7:
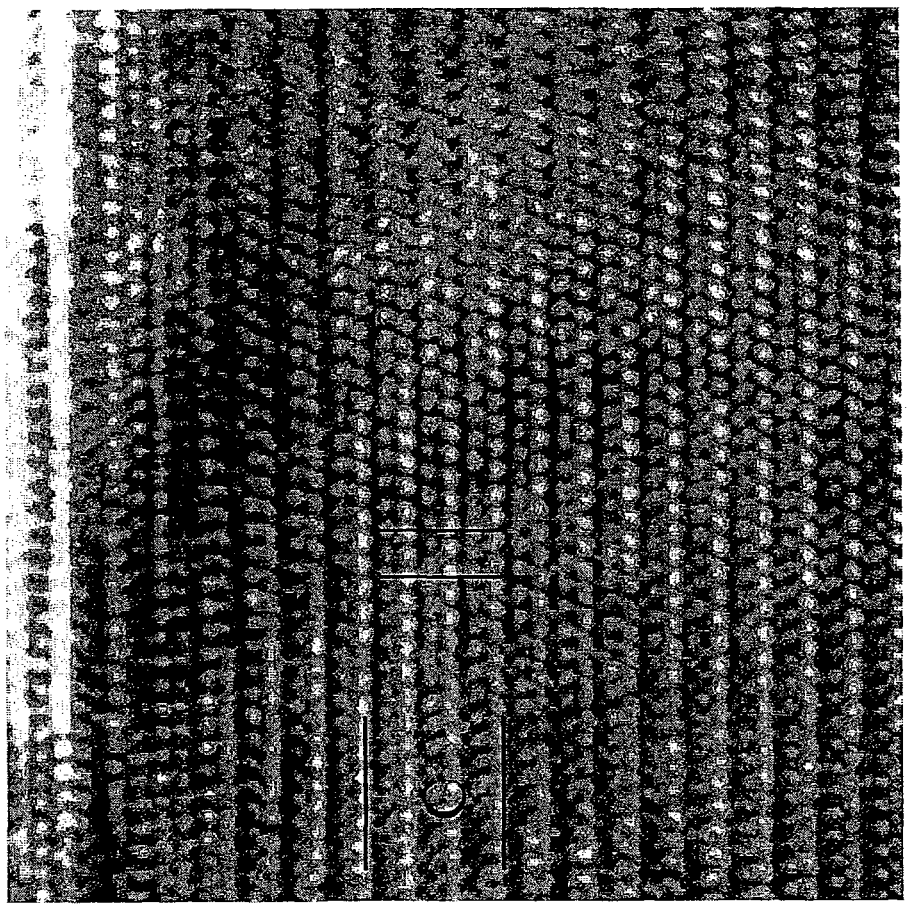
FIG. 7 is a TEM image showing the oxygen arrangement of $LiNi_{1/3}Mn_{1/3}Co_{1/3}O_2$.

FIG. 6 is a TEM image showing the oxygen arrangement of $LiNi_{1/2}Mn_{1/2}O_2$. In the figure, white portions represent oxygen atoms, and the box drawn in FIG. 6 shows that the oxygen arrangement is a cubic close-packed structure with ABCABC stacking in the layer direction. FIG. 7 is a TEM image showing the oxygen arrangement of $LiNi_{1/3}Mn_{1/3}Co_{1/3}O_2$, and it also indicates that oxygen atoms are arranged in the ABCABC pattern like those of $LiNi_{1/2}Mn_{1/2}O_2$.

Figure 9:
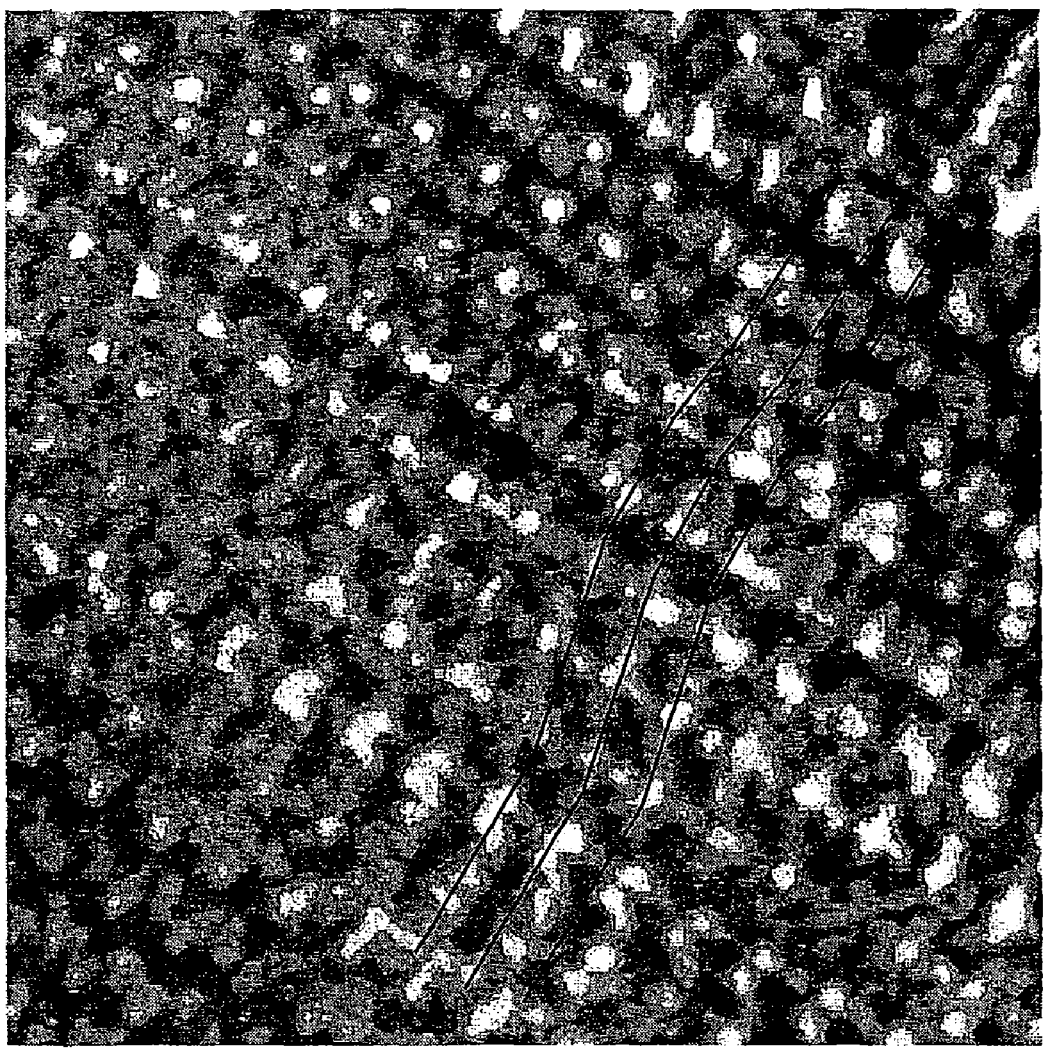
FIG. 9 is a TEM image showing a disorder in the crystal lattice of $LiNi_{1/2}Mn_{1/2}O_2$.

FIG. 8(a) and (b) show TEM images illustrating a defect in the crystal lattice of $LiNi_{1/2}Mn_{1/2}O_2$. FIG. 8(b) is an enlarged image of 8(a). As is apparent from FIG. 8(b), the grains in the upper right portion and those in the lower left portion are the same, but a defect is observed in the portion indicated by the arrow. FIG. 9 is a TEM image showing a disorder in the crystal lattice of $LiNi_{1/2}Mn_{1/2}O_2$.

Such defect and disorder are essential in order to obtain an excellent active material in accordance with the present invention. In the active material having such defect and disorder, the lattice repeatedly expands and contracts during charging/discharging. The stress due to the expansion and contraction generally breaks down the lattice, contributing a decrease in cycle life. In the present invention, however, the defect and disorder in the lattice allow the stress due to the expansion and contraction of the lattice to be relieved, resulting in an improvement in cycle life.

Next, the superlattice arrangement in the positive electrode active material in accordance with the present invention is explained. FIG. 10 is electron beam diffraction images of $LiNi_{1/2}Mn_{1/2}O_2$. FIG. 10 shows a part of the electron beam diffraction pattern. In almost every electron beam diffraction pattern assigned as R3-m, extra spots (a) or streaks (b) are observed. This is very similar to those observed in the electron beam diffraction patterns of $Li[Li_{1/3}Mn_{2/3}]O_2$ when assigned as C2/m. The intensity of these extra spots or streaks depends on particle type. Moreover, it is presumed that it also depends on the degree of the twining portion, defect or disorder.

It is presumed that these extra spots result from a superlattice arrangement of a $[\sqrt{3}\times\sqrt{3}]$ R30°. In order to find a superlattice pattern in a short range from TEM images, the images analyzed by Fourier transformation technique are shown in FIGS. 11 and 12. FIGS. 11(a) and 12(a) show the original TEM images. FIGS. 11(b) and 12(b) show the transformed TEM images. The images of FIGS. 11(b) and 12(b) were obtained by first Fourier transforming the images of FIGS. 11(a) and 12(a) to remove fundamental spots to give images with only extra spots, which were then again Fourier transformed. Accordingly, the images of FIGS. 11(b) and 12(b) indicate, although in a short range, only the arrangement pattern of the superlattice. As is evident from FIGS. 11(b) and 12(b), images showing a periodicity are observed.

It is essential to use nickel and manganese at a ratio of 1:1 in order to obtain the particle morphology and crystal structure described above. While the above has described the present invention using $LiNi_{1/2}Mn_{1/2}O_2$ and $LiNi_{1/3}Mn_{1/3}Co_{1/3}O_2$ as representative examples, a similar tendency is observed when the added amount of Co to $LiNi_{1/2}Mn_{1/2}O_2$ satisfies $0 \leq Co/(Ni+Mn) \leq 2$. It is preferred that the added amount satisfies $Co/(Ni+Mn) \leq 1$, more preferably the formula (2):

$$LiCo_{x/3}Ni_{((3-x)/6)}Mn_{((3-x)/6)}O_2 \qquad (2)$$

where $0 \leq x \leq 1$, because the above characteristics clearly appears in the range indicated by the formula (2).

Figure 13:
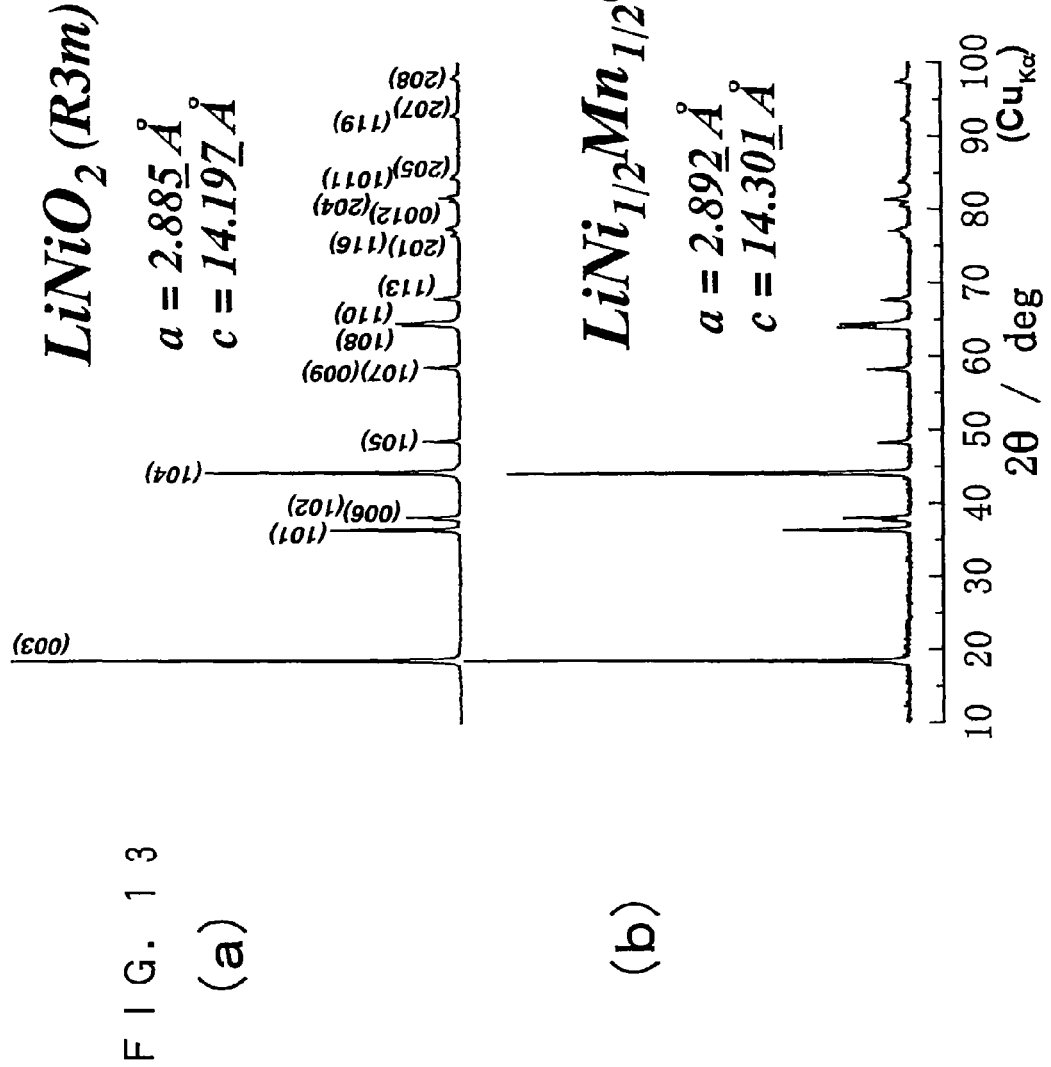
FIG. 13 is X-ray diffraction patterns of $LiNiO_2$ and $LiNi_{1/2}Mn_{1/2}O_2$.

FIG. 13(b) shows an X-ray diffraction pattern of $LiNi_{1/2}Mn_{1/2}O_2$. The integrated intensities of the characteristic peaks of (104) and (003) in Miller indices assigned as hexagonal crystal are carefully measured. The measured values are calculated to give an integrated intensity ratio of (003)/(104)=0.847. FIG. 13(a) shows an X-ray diffraction pattern of $LiNiO_2$ for comparison. The integrated intensity ratio of $LiNiO_2$ was (003)/(104)=1.34. Typically, the peak intensity of (003) plane is the strongest in the X-ray diffraction patterns of $LiCoO_2$ and $LiNiO_2$ generally having a layered structure. Accordingly, the value determined from (003)/(104) is always over 1.

The integrated intensity is expressed by, not the peak height, but the peak area. In the X-ray diffraction pattern shown in FIG. 13(b), the integrated intensity of (104) plane is the greatest. It is conventionally considered that the material having such peak contains a rock salt structure in which transition metal migrate into a lithium site, and thus it is not suitable as active material because its capacity is small and polarization is large.

However, in the X-ray diffraction pattern of $LiNi_{1/2}Mn_{1/2}O_2$ of the present invention, the value determined from (003)/(004) is 1 or less. From this, it can be said that the positive electrode active material of the present invention is similar to conventional materials in composition, but it is completely different from conventional ones. FIG. 14 shows the peak intensities of $LiNiO_2$ and $LiNi_{1/2}Mn_{1/2}O_2$ in FIGS. 13(a) and (b).

Figure 15:
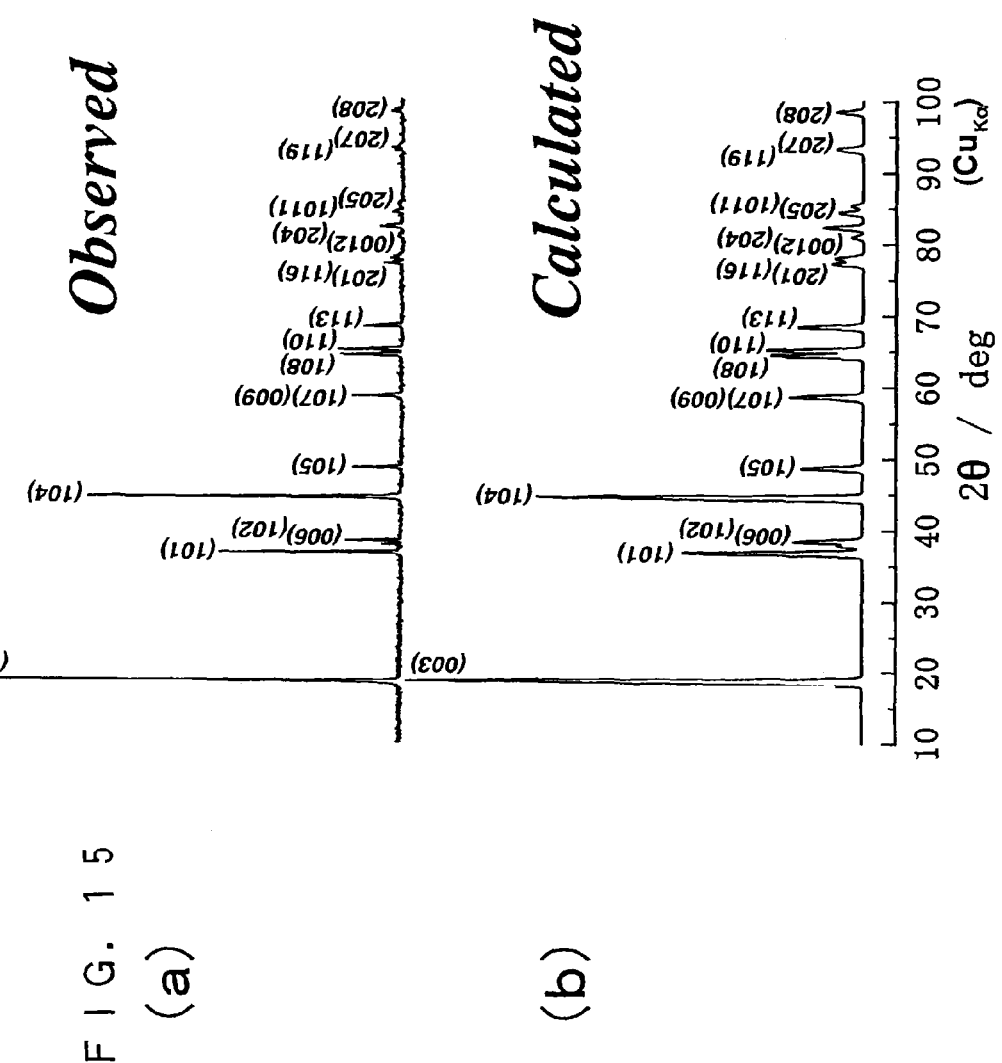
FIG. 15 is X-ray diffraction patterns of $LiNi_{1/3}Mn_{1/3}Co_{1/3}O_2$.

FIG. 15 shows X-ray diffraction patterns of $LiNi_{1/3}Mn_{1/3}Co_{1/3}O_2$. A layered structure was clearly observed because Co was added. The value obtained from (003)/(104) was 1.15, which was over 1. FIG. 16 shows the Miller indices when assigned as R3-m, the observed and calculated "d" values, and the intensity ratios.

It should be noted that the present inventors found earlier, from the analytical results by theoretical calculation (first principle calculation) and XAFS measurement (X-ray absorption fine structure), that it is important, in those materials, to control nickel element to be bivalent, manganese element to be tetravalent and cobalt element to be trivalent. It has been confirmed that these analytical results can be applied to the active material of the present invention.

(2) Electrochemical Characteristics of Positive Electrode Active Material in Accordance with the Present Invention $LiCoO_2$, which is currently the most widely used positive electrode active material for a lithium secondary battery, has an electric capacity of 140 to 145 mAh/g at 4.3 V charge relative to lithium metal. A practical battery in which a carbonaceous material is used in the negative electrode also exhibits a similar utilization rate as above. Accordingly, if the same or more capacity is not ensured in this potential range, $LiCoO_2$ will be unappealing.

The electrochemical characteristics of the positive electrode active material of the present invention having the particle morphology and crystal structure described in the above (1) were evaluated by applying the active material to a coin type battery. The coin battery was fabricated in accordance with the following procedure. The positive electrode active material, acetylene black as the conductive material and a polyvinylidene fluoride resin (hereinafter referred to as "PVDF") as the binder were mixed in a weight ratio of 80:10:10, to form a molded article in the shape of a sheet. The molded article was then punched in the shape of a disc and dried at a temperature of 80° C. for about 15 hours in vacuo, to obtain a positive electrode. Likewise, a sheet made of lithium metal was punched in the shape of a disc to form a negative electrode. A microporous polyethylene film was used as the separator, and the electrolyte was prepared by dissolving 1 mol of $LiPF_6$ into a solvent mixture of EC (ethylene carbonate) and EMC (ethyl methyl carbonate) in a volumetric ratio of 1:3. Using these materials, a coin battery of 2016 size (20 mm in diameter and 1.6 mm in thickness) was fabricated by a conventional method.

Figure 17:
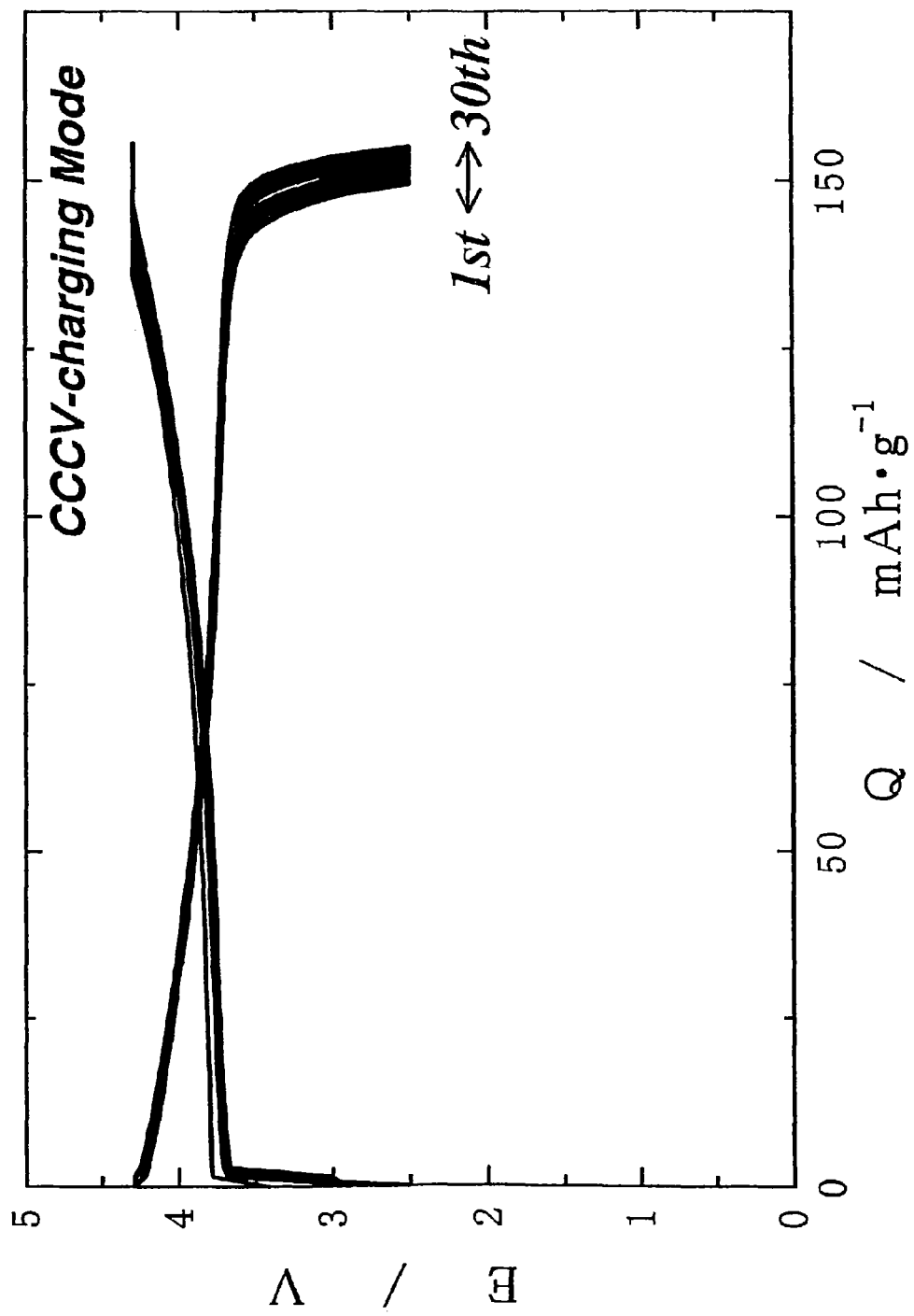
FIG. 17 is a graph showing a charge/discharge curve of $LiNi_{1/2}Mn_{1/2}O_2$ when charged at 4.3 V (charging at constant voltage and constant current) relative to lithium metal.
Figure 18:
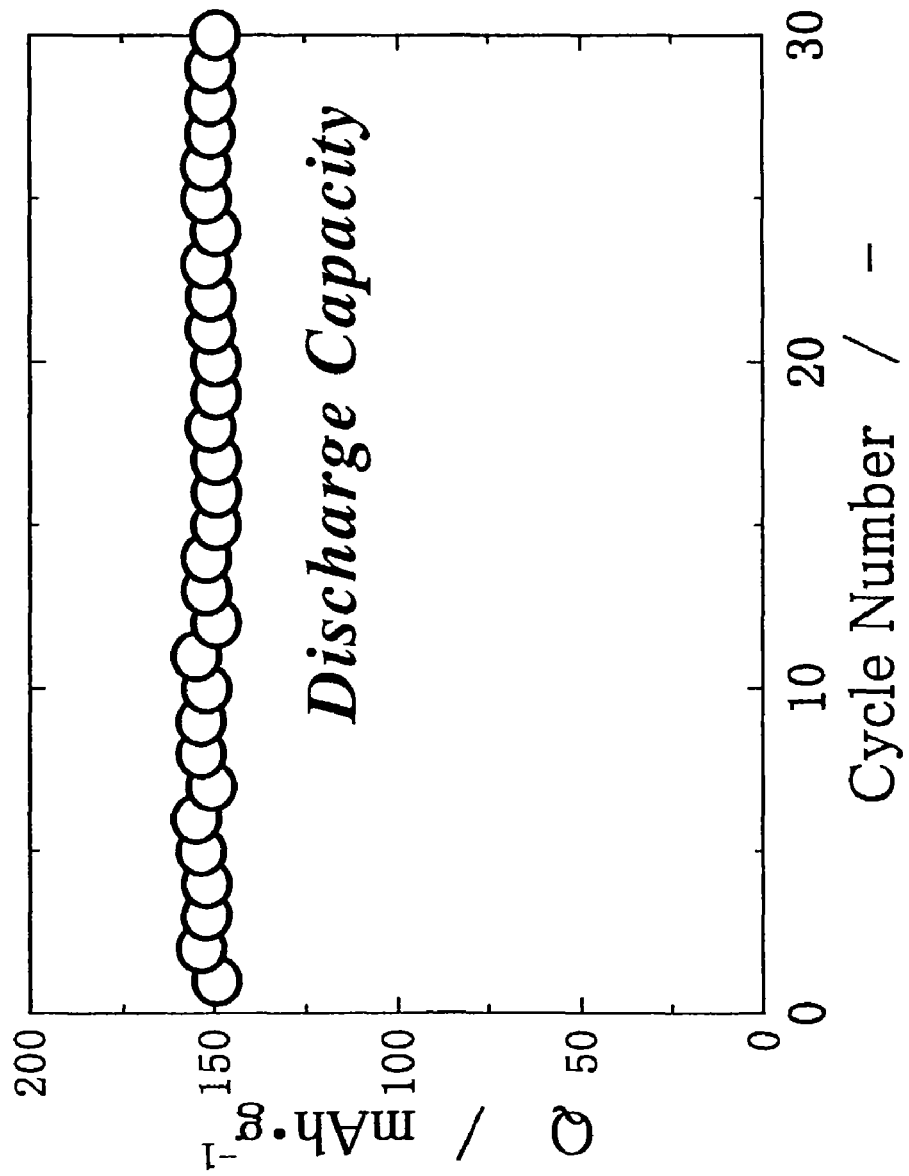
FIG. 18 is a graph showing the discharge capacity versus cycle number of $LiNi_{1/2}Mn_{1/2}O_2$.
Figure 19:
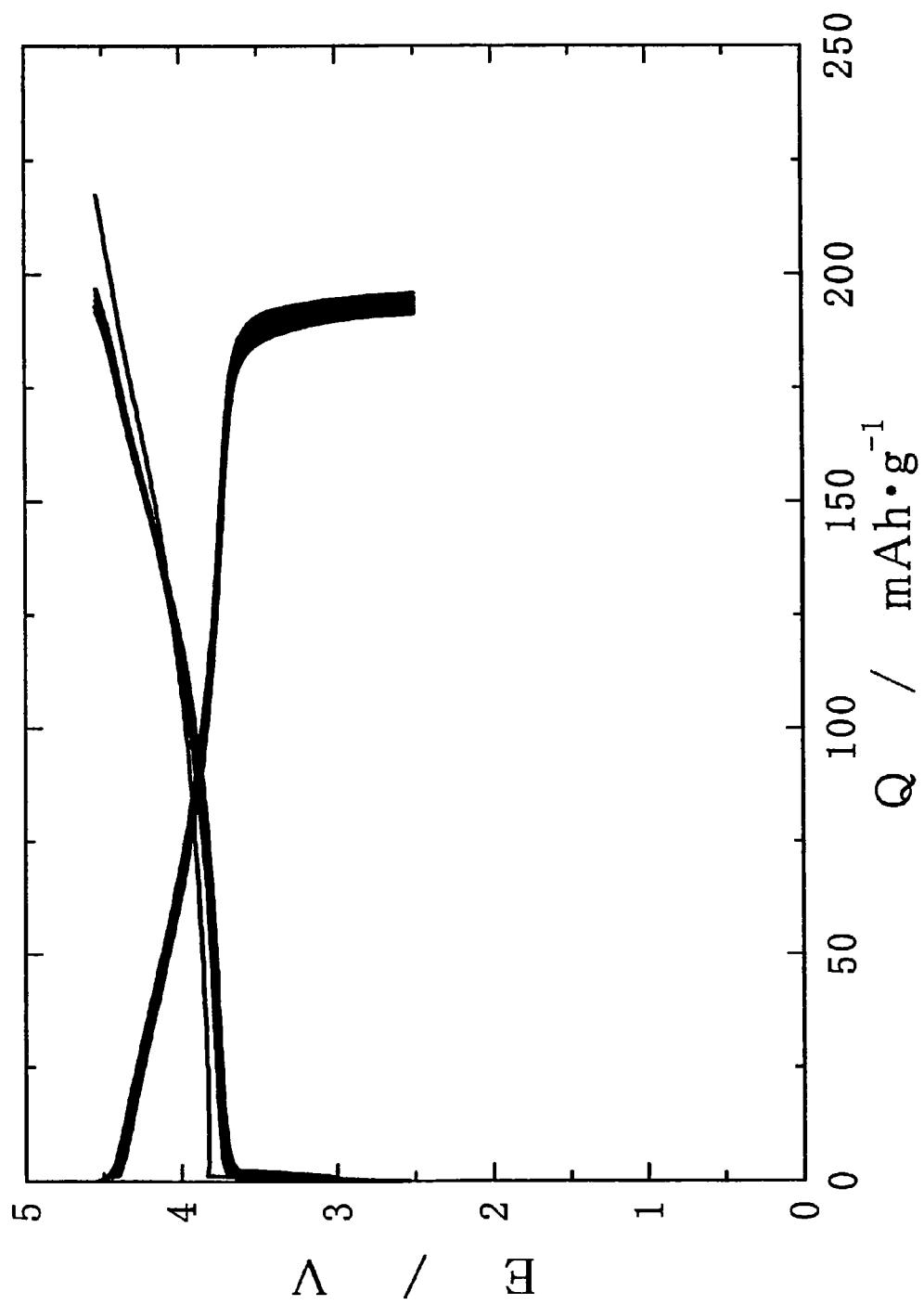
FIG. 19 is a graph showing a charge/discharge curve of $LiNi_{1/2}Mn_{1/2}O_2$ when charged up to 4.6 V relative to lithium metal.
Figure 20:
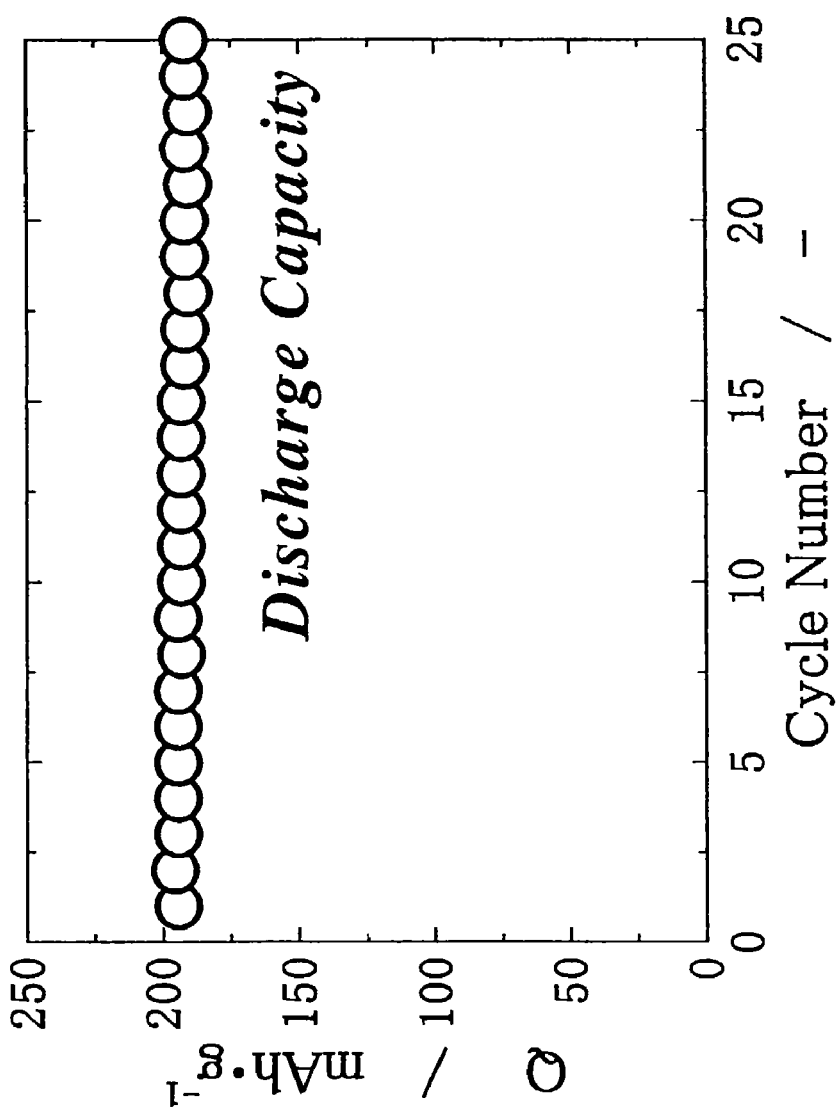
FIG. 20 is a graph showing the discharge capacity versus cycle number of $LiNi_{1/2}Mn_{1/2}O_2$.

FIG. 17 is a graph showing a charge/discharge curve of $LiNi_{1/2}Mn_{1/2}O_2$ when charged at 4.3 V (charging at constant voltage and constant current) relative to lithium metal. FIG. 18 is a graph showing the discharge capacity versus cycle number of $LiNi_{1/2}Mn_{1/2}O_2$. FIG. 18 indicates that a charge/discharge capacity of about 150 mAh/g and a higher discharge voltage of 4 V are obtained. The charging was further performed up to 4.6 V, which was considered practically impossible in $LiCoO_2$ and $LiNiO_2$ in light of the stability of crystal structure and the reactivity of electrolyte. FIG. 19 is a graph showing a charge/discharge curve of $LiNi_{1/2}Mn_{1/2}O_2$ when charged up to 4.6 V relative to lithium metal. FIG. 20 is a graph showing the discharge capacity versus cycle number of $LiNi_{1/2}Mn_{1/2}O_2$. FIG. 20 indicates that a charge/discharge capacity of about 195 mAh/g is obtained and the cycle life is very good.

Figure 21:
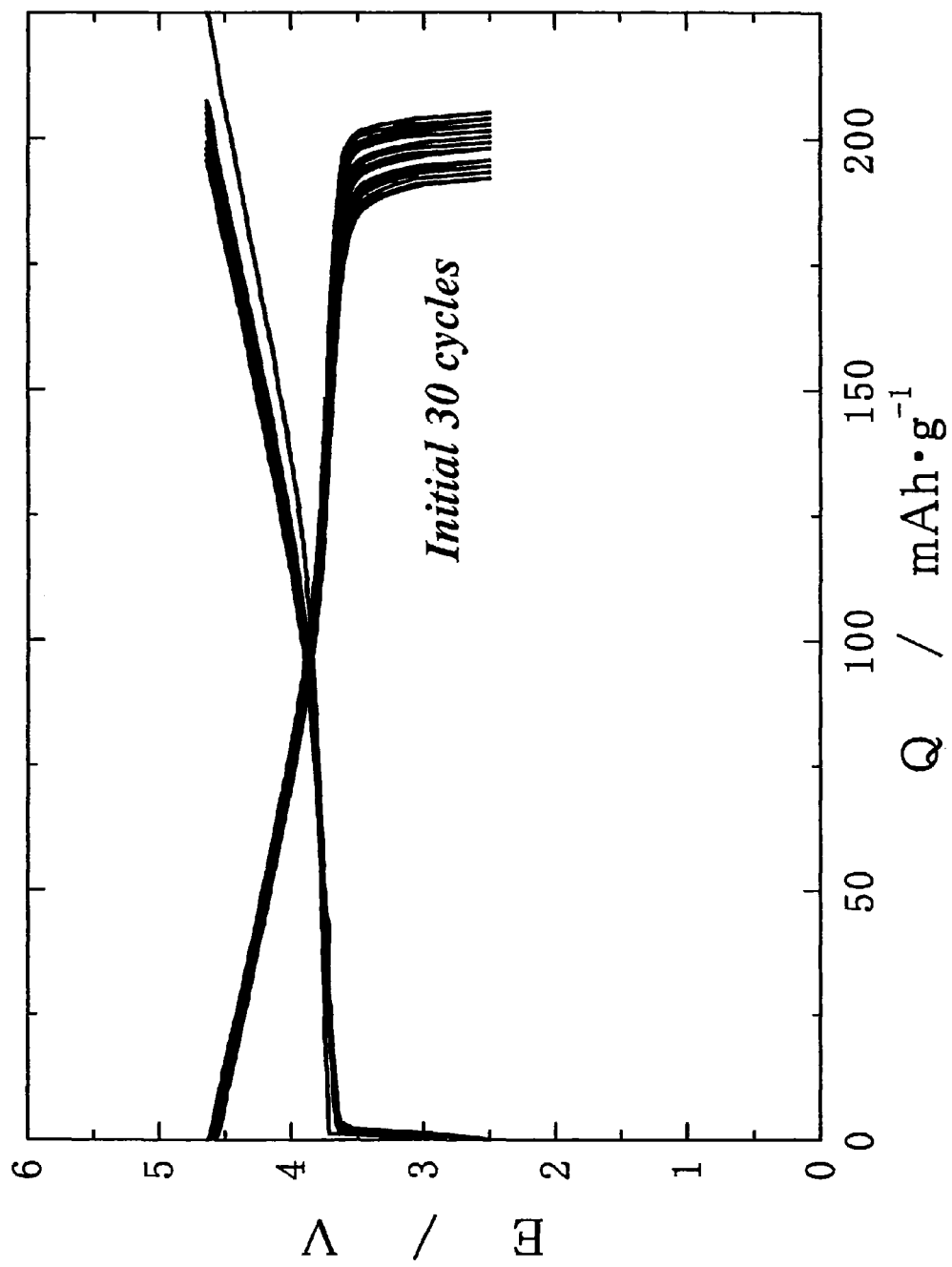
FIG. 21 is a graph showing a charge/discharge curve of $LiNi_{1/3}Mn_{1/3}Co_{1/3}O_2$ when charged up to 4.6 V.
Figure 22:
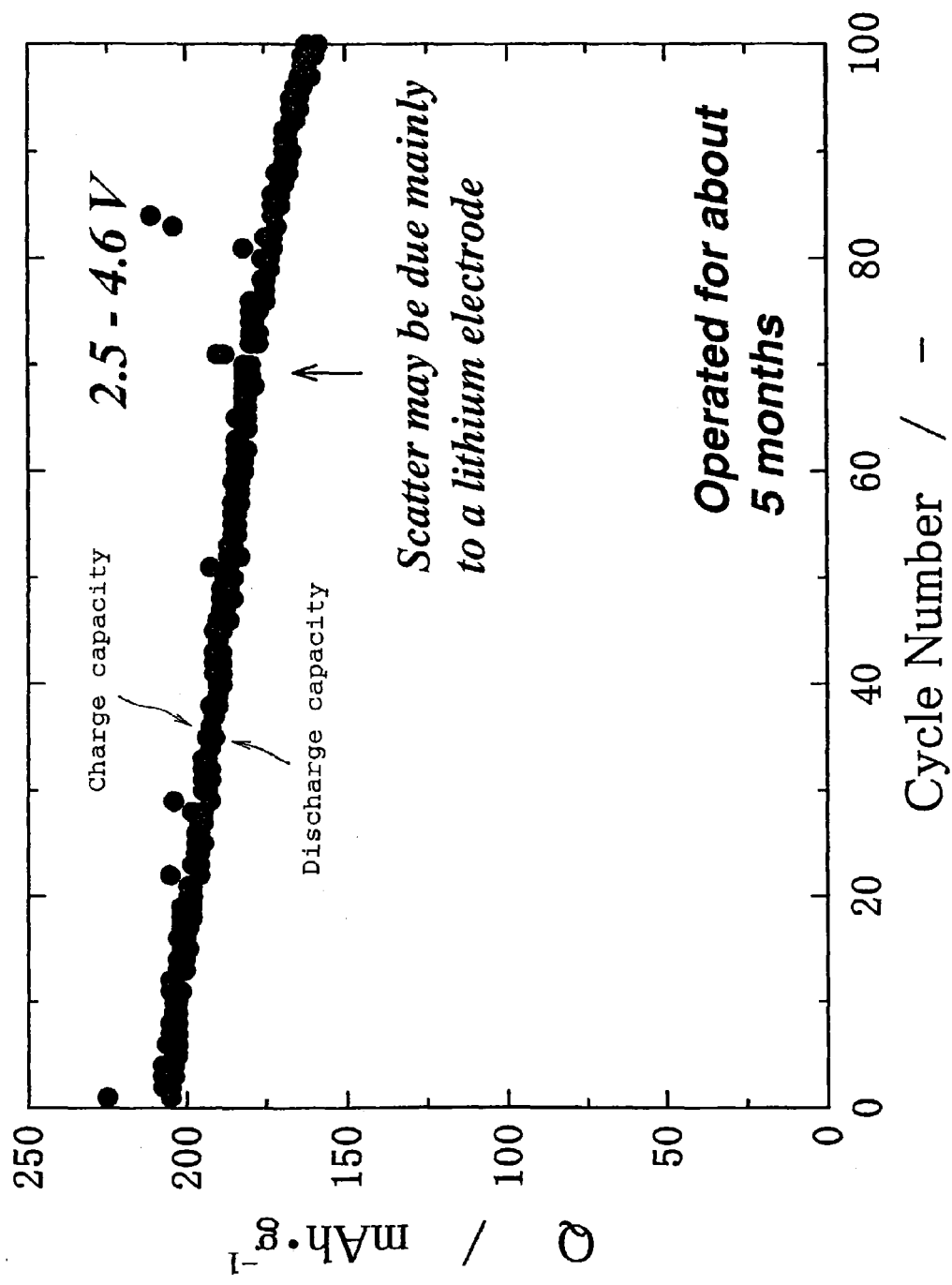
FIG. 22 is a graph showing the cycle life of $LiNi_{1/3}Mn_{1/3}Co_{1/3}O_2$ when charged up to 4.6 V.

Similarly, FIGS. 21 and 22 respectively show the charge/discharge curve and cycle life of $LiNi_{1/3}Mn_{1/3}Co_{1/3}O_2$ when charged up to 4.6 V. The figures indicate that a charge/discharge capacity of about 200 mAh/g is obtained and the cycle life is very good.

As described above, the present invention can provide an active material with higher capacity and more excellent cycle life than conventional ones.

(3) Method of Producing Positive Electrode Active Material in Accordance with the Present Invention Now, a method of producing a positive electrode active material of the present invention is specifically described. A representative production method is given here. As stated above, particle morphology is important in the present invention. Therefore, it is to be understood, if the above-described particle morphology is realized, the invention is not limited to the method given hereinafter.

The method of producing the positive electrode active material in accordance with the present invention comprises: (a) a step of preparing a hydroxide as a precursor by feeding an alkaline solution together with an aqueous solution containing two or more transition-metal salts or two or more aqueous solutions containing a different transition-metal salt into a reaction vessel, and by coprecipitating the hydroxide while adding a reducing agent or bubbling an inert gas; (b) a step of drying the obtained precursor at 300 to 500° C. to obtain a dry precursor; and (c) a step of obtaining a lithium-containing transition metal oxide by baking a mixture of the dry precursor and a lithium compound, followed by cooling.

First, the coprecipitation in step (a) is the method primarily to obtain a composite hydroxide by simultaneously coprecipitating a plurality of elements in an aqueous solution through neutralization reaction. In the case of using nickel, manganese and cobalt, since manganese is prone to be oxidized, manganese is sufficiently oxidized into trivalent manganese ions even by a trace amount of dissolved oxygen present in the aqueous solution. As a result, its dispersion and formation of solid solution at the atomic level is insufficient. The point of this step is to produce a double hydroxide or triple hydroxide by allowing nickel, manganese and cobalt elements to be present in one layered hydroxide without separation. In order to avoid such event, conventionally, dissolved oxygen is removed by bubbling an inert gas such as nitrogen or argon in the aqueous solution, or a reducing agent such as hydrazine is previously added to the aqueous solution. This is also important in the present invention.

In the present invention, sulfate was used as an aqueous solution containing transition metal salts. The use of nitrate is not preferred because nitrate can oxidize manganese in the presence of nickel ions. The present inventors fed a mixed solution of a 1.2 mol/liter $NiSO_4$ aqueous solution, a 1.2 mol/liter $MnSO_4$ aqueous solution and a 1.2 mol/liter $CoSO_4$ aqueous solution, a 4.8 mol/liter NaOH aqueous solution and a 4.8 mol/liter $NH_3$ solution simultaneously into the reaction vessel at a flow rate of 0.5 milliliter/min. Additionally, in the case where the ratio of nickel and manganese is required to be 1:1 like that of the positive electrode active material of the present invention, the composition ratio should be exactly 1:1.

For comparison, FIG. 23 shows X-ray diffraction patterns of materials containing nickel and manganese at a composition ratio of slightly different from 1:1. FIG. 23(a) shows the X-ray diffraction pattern in the case of the composition ratio of Ni and Mn being 1.02:0.98 (Ni:Mn=1.02:0.98), and FIG. 23(b) shows that in the case of the composition ratio being 1.005:0.995 (Ni:Mn=1.005:0.995). FIG. 24 shows graphs showing the charge/discharge curve of these materials. FIG.

24 indicates that the material with Ni:Mn=1.005:0.995 is superior to that with Ni:Mn=1.02:0.98 in terms of initial capacity and cycle life. Their X-ray diffraction patterns are similar and almost indistinguishable. Conventionally, active materials have been evaluated only by their composition and X-ray diffraction patterns, but it is clear, from the above, that to evaluate an active material only by its composition and X-ray diffraction pattern is not enough. Additionally, in the case of adding cobalt, the ratio of Ni and Mn should also be exactly 1:1.

Then, the next step gives a dry precursor by heat-baking the hydroxide as precursor obtained in step (a). The heating temperature is preferably 300 to 500° C. because, in this temperature range, the weight after the completion of dehydration of water contained in the hydroxide by heating is constant. If the temperature exceeds 500° C., the crystallinity of the precursor increases excessively, which reduces the reactivity with lithium and therefore is not preferable. The heating temperature depends on the amount of the powdered precursor to be dried and the like, but 1 to 10 hours is enough to complete the dehydration.

In step (c), the dry precursor is mixed with a lithium compound and the obtained mixture is baked. As the lithium compound, lithium carbonate and/or lithium hydroxide is preferably used. Particularly, lithium hydroxide is preferred. Although it is possible to obtain a positive electrode active material comprising desired single phase lithium-containing composite oxide by using lithium carbonate, the use of lithium hydroxide is more advantageous in terms of crystallinity and controlling of particle morphology. Nickel-manganese-cobalt hydroxide or oxide is thoroughly dry mixed with lithium hydroxide.

When mixing, lithium hydroxide and the composite hydroxide of nickel, manganese and cobalt can be mixed according to the composition of positive electrode active material to be obtained, but it is optimal that they be mixed such that the atomic ratio of Li, Ni, Mn and Co satisfies the equation: Li/(Ni+Mn+Co)=1. It is also possible to slightly increase or decrease the above atomic ratio in order to control physical properties. For example, when baking at a high temperature, when it is necessary to make primary particles obtained after baking large, or when it is necessary to stabilize the crystal structure, the amount of lithium is slightly increased for mixing. In this case, fluctuations of about 3% are preferred.

The atmosphere in which the mixture of the dried precursor and the lithium compound is baked may be any atmosphere if it is an oxidative atmosphere. Accordingly, a normal air atmosphere may be used. The baking temperature is preferably 900 to 1200° C. because the oxidation reactions of elements such as nickel, manganese and cobalt is likely to occur simultaneously at the above temperatures in the mixture prepared by dry-mixing lithium hydroxide and the hydroxide or oxide obtained through the coprecipitation to give a homogenous composite oxide.

Figure 26:
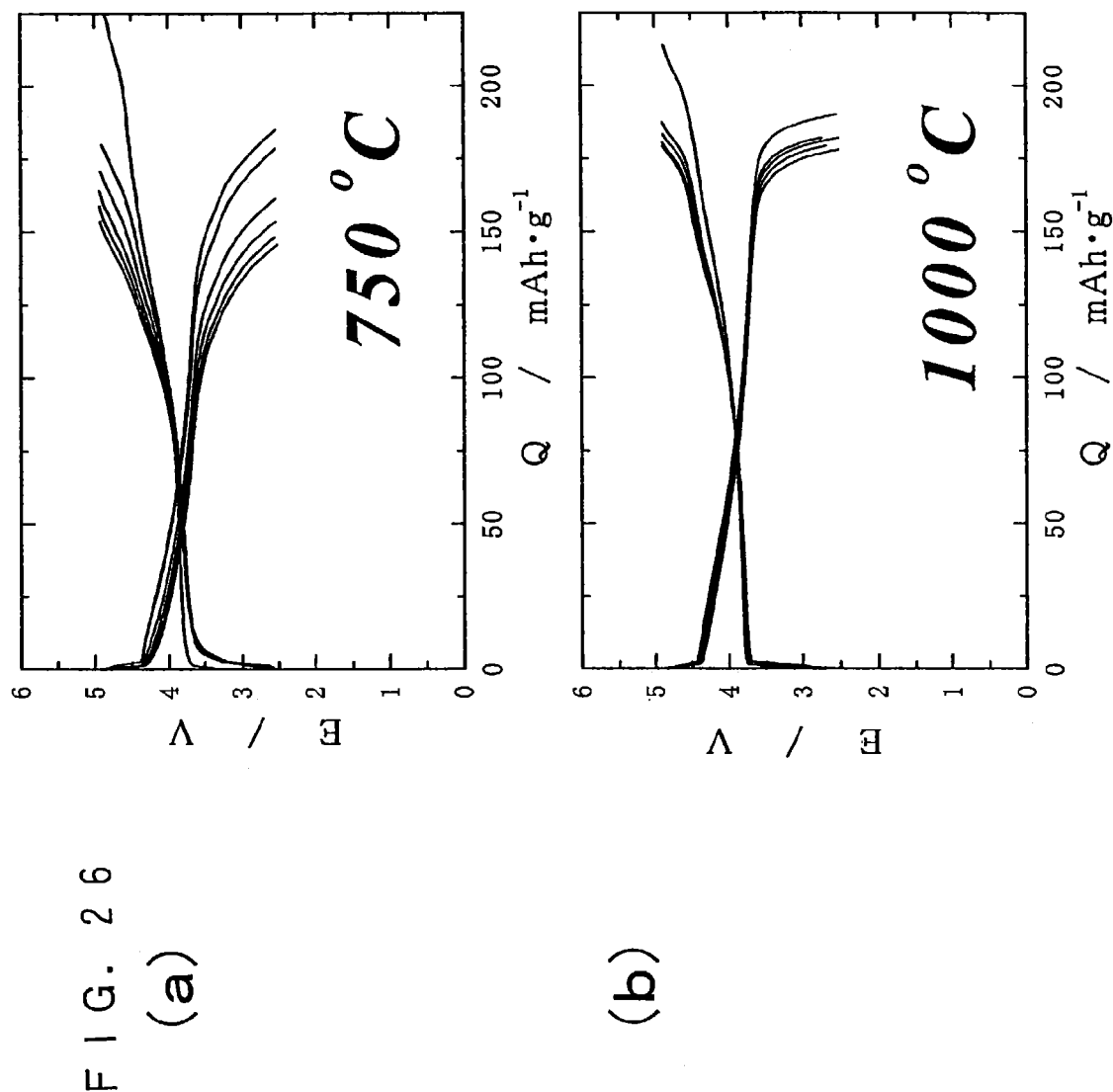
FIG. 26 is graphs showing a charge/discharge curve of $LiNi_{1/2}Mn_{1/2}O_2$ at different baking temperatures.

FIG. 25 shows charge/discharge behavior of $LiNi_{1/2}Mn_{1/2}O_2$ at different baking temperatures. FIG. 25(a) shows the X-ray diffraction pattern of one obtained at a baking temperature of 750° C., and FIG. 25(b) shows that at a baking temperature of 1000° C. Likewise, FIG. 26(a) shows the charge/discharge curve obtained at a baking temperature of 750° C., and FIG. 26(b) shows that at a baking temperature of 1000° C. It is evident from FIGS. 25 and 26 that the material obtained by baking at 1000° C. is superior in terms of electric capacity and cycle life. It is preferred that baking be performed for 1 to 10 hours after a predetermined temperature is reached.

In the method of producing the positive electrode active material in accordance with the present invention, an innovative control is performed during baking and cooling. Basically, rapid heating and quenching are performed in the present invention. It is preferred that rapid heating be performed at a rising temperature rate of not less than 7° C./min and quenching be performed at a cooling rate of not less than 5° C./min. Thereby, it is possible to control the grains within the primary particle as stated above. It is presumed that, when quenching is performed, oxygen loss occurs. Accordingly, it is preferred to perform heating treatment again at 700 to 750° C. in an air atmosphere.

To sum up, in order to synthesize the material of the present invention, the following points should be achieved on the basis of a conventional coprecipitation method.

(i) Thorough prevention of oxidation of Mn ion by removal of dissolved oxygen, removal of nitric acid ion, and addition of a reducing agent.

(ii) Increase of precision of the ratio of nickel and manganese (1:1).

(iii) Performance of rapid heating and quenching in the step of baking.

It is to be understood that, although the positive electrode active material in accordance with the present invention substantially contains transition metals such as nickel, manganese and cobalt, it can easily be conceived that addition of a different kind of element (an additional element or a dopant) to the crystal particles constituting the positive electrode active material can give an additional value.

Accordingly, the positive electrode active material of the present invention may contain a different kind of element other than those described above. In particular, since the crystal particle constituting the positive electrode active material comprising the lithium-containing transition metal oxide is granular, it is practical to add such additional element in the vicinity of the surface of the crystal particle. The present invention includes any of positive electrode active materials having an additional function by such additional element.

Examples of the different kind of element include aluminum, magnesium, calcium, strontium, zirconium, yttrium and ytterbium, etc. Doping the positive electrode active material with aluminum slightly increases the electric potential of the positive electrode active material and improves the thermal stability thereof at the same time. In this case, when the mixture of lithium hydroxide and the precursor obtained in the above-described steps (a) and (b) is baked, an appropriate amount of aluminum source such as aluminum hydroxide should be mixed at the same time. Thereby, aluminum is not uniformly doped into the particles of the eutectic oxide and thus aluminum is doped onto the vicinity of the surface of the crystal particles and the concentration of aluminum thereof becomes higher.

This can be confirmed by a characteristic X-ray diffraction analysis of the crystal particle, or the like. Accordingly, doping enables the main body of the crystal particles constituting the positive electrode active material to retain the crystal structure of the transition metal elements, and it is possible to add the above-mentioned effect by changing only the state of the surface of the crystal particles.

In addition, it is effective to allow aluminum to be dispersed somewhat unevenly on the surface because the effect of the crystal structure decreases as the added amount of aluminum increases. The addition of strontium, zirconium, yttrium, calcium, ytterbium, etc also enables the effect of improving the heat resistance to be attained. Further, the addition of magnesium can increase the electronic conductivity of the positive electrode active material by one or two digits. Similar to the above, magnesium hydroxide should be mixed with the precursor and the lithium hydroxide, followed by baking. The baking should be performed according to the method describe above. When thus-obtained positive electrode active material is applied to a battery, the amount of the electrically conductive material can be reduced because the electronic conductivity is extremely high; thus, the increase in capacity can be expected. The added amount of these different elements is effectively within the range of 0.05 to 20 atom % of the total amount of the three transition metals. If the amount is less than 0.05 atom %, the sufficient effect cannot be obtained. On the contrary, if the amount exceeds 20 atom %, the capacity decreases.

(4) Non-Aqueous Electrolyte Secondary Battery

In the following, a description is given of other constituent materials that can be used when fabricating a non-aqueous electrolyte (lithium) secondary battery using the positive electrode active material of the present invention.

The electrically conductive material used in the positive electrode material mixture for the production of the positive electrode of the present invention is not limited to a particular material, but any electronically conductive material can be used as long as the material does not cause any chemical change in the fabricated battery. Examples include: graphites such as natural graphite (scale graphite and the like) and artificial graphite; carbon blacks such as acetylene black, Ketjen black, channel black, furnace black, lamp black and thermal black; electrically conductive fibers such as carbon fiber and metallic fiber; metallic powders such as carbon fluoride powder, copper powder, nickel powder, aluminum powder and silver powder; electrically conductive whiskers such as zinc oxide whisker and potassium titanate whisker; electrically conductive metal oxides such as titanium oxide; electrically conductive organic materials such as polyphenylene derivatives; etc. These materials can be used alone or in any combination thereof within the scope the present invention if the effect is not impaired. Among them, artificial graphite, acetylene black and nickel powder are particularly preferable. The amount of the electrically conductive material to be added is not particularly specified, but from 1 to 50 wt % is preferable, and from 1 to 30 wt % is particularly preferable. In the case of carbon and graphite, from 2 to 15 wt % is particularly preferable.

For the binder used in the positive electrode material mixture of the present invention, a polymer having a decomposition temperature of 300° C. or higher is preferable. Examples include polyethylene, polypropylene, polytetrafluoroethylene (PTFE), polyvinylidene fluoride (PVDF), tetrafluoroethylene-hexafluoroethylene copolymer, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethyl vinyl ether-tetrafluoroethylene copolymer, etc. These materials can be used alone or in any combination thereof within the scope of the present invention if the effect is not impaired.

Among them, polyvinylidene fluoride (PVDF) and polytetrafluoroethylene (PTFE) are most preferable.

As the current collector for the positive electrode, any electronic conductor can be used as long as the conductor does not cause any chemical change in the fabricated battery. Examples of the material, which constitutes the current collector, include stainless steel, nickel, aluminum, titanium, various alloys or carbons, as well as a composite material such as aluminum or stainless steel with the surface thereof treated with carbon, nickel, titanium or silver.

Among them, aluminum or an aluminum alloy is preferable. The surface of these materials may be treated with oxidization. Alternatively, the surface of the current collector may be roughened by surface treatment. As for the current collector shape, any shape commonly employed in the field of batteries can be used. Examples of the shape include a foil, a film, a sheet and a net, a punched sheet, a lath body, a porous body, a foamed body, fibers and a non-woven fabric. The thickness is not particularly specified, but the thickness of from 1 to 500 μm is preferable.

As the negative electrode material used in the present invention, any compound can be used as long as the compound absorbs and desorbs lithium ions; examples include lithium, lithium alloy, alloy, intermetallic compounds, carbon, organic compounds, inorganic compounds, metal complexes and organic polymer compounds. These materials can be used alone or in any combination thereof within the scope of the present invention if the effect is not impaired.

Examples of the lithium alloys include Li—Al based alloys, Li—Al—Mn based alloys, Li—Al—Mg based alloys, Li—Al—Sn based alloys, Li—Al—In based alloys, Li—Al—Cd based alloys, Li—Al—Te based alloys, Li—Ga based alloys, Li—Cd based alloys, Li—In based alloys, Li—Pb based alloys, Li—Bi based alloys, Li—Mg based alloys. In this case, the lithium content is preferably 10 wt % or higher.

As the alloy and intermetallic compounds, there are a compound of a transition metal and silicon, a compound of a transition metal and tin and the like. Particularly, a compound of nickel and silicon is preferred.

As the carbonaceous materials, there are coke, pyrolytic carbon, natural graphite, artificial graphite, mesocarbon microbeads, graphite mesophase particles, gas phase grown carbon, vitrified carbons, carbon fiber (polyacrylonitrile type, pitch type, cellulose type and gas phase grown carbon), amorphous carbon and carbons obtained by baking organic materials. These materials can be used alone or in any arbitrary combination thereof within the scope of the present invention if the effect is not impaired. Among them, graphite materials such as graphite mesophase particles, natural graphite, and artificial graphite are preferable.

It is to be noted that the carbonaceous material may contain, in addition to carbon, a different element or a compound such as O, B, P, N, S, SiC and $B_4C$. The content thereof is preferably from 0 to 10 wt %.

As the organic polymer compound, there are, for example, polymer compounds such as polythiophene and polyacetylene, and as the nitride, there are, for example, cobalt nitride, copper nitride, nickel nitride, iron nitride and manganese nitride.

These negative electrode materials may be used in combination; for example, a combination of carbon and an alloy or a combination of carbon and an inorganic compound is possible.

The average particle size of the carbon material used in the present invention is preferably from 0.1 to 60 μm, and more preferably from 0.5 to 30 μm. The specific surface area is preferably from 1 to 10 $m^2/g$. In terms of crystal structure, graphite having a hexagonal lattice spacing ($d_{002}$) of carbon of 3.35 to 3.40 Å and a size (LC) of the crystalline in the c-axis direction of 100 Å or larger, is preferable.

In the present invention, since the positive electrode active material includes Li, a negative electrode material (carbon or the like) that does not include Li can be used. However, it is preferred to add a small amount of Li (about 0.01 to 10 parts by weight per 100 parts by weight of the negative electrode material) into such a negative electrode material with no Li, because if part of Li becomes inactive by reacting with the electrolyte, for example, it can be supplemented with the Li added in the negative electrode material.

In order to add Li into the negative electrode material described above, for instance, melt lithium metal obtained by heating is applied onto the negative electrode material attached to the current collector; alternatively, lithium metal is attached to the electrode group by pressing in advance and Li is electrochemically added into the negative electrode material.

Similar to the case of the electrically conductive material used in the positive electrode material mixture, the electrically conductive material used in the negative electrode material mixture is not limited to a particular material, and any electronically conductive material can be used as long as the material does not cause any chemical change in the fabricated battery. When the carbonaceous material is used as the negative electrode material, it is unnecessary to add the electrically conductive material thereto because the carbonaceous material itself has electronic conductivity.

As the binder used in the negative electrode material mixture, either a thermoplastic resin or a thermosetting resin can be used, and the preferred binder is a polymer having a decomposition temperature of 300° C. or higher.

Examples of the binder include polyethylene, polypropylene, polytetrafluoroethylene (PTFE), polyvinylidene fluoride (PVDF), styrene-butadiene rubber, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer and vinylidene fluoride-perfluoromethyl vinyl ether-tetrafluoroethylene copolymer. Among them, styrene-butadiene rubber and polyvinylidene fluoride are preferred, and most preferably styrene-butadiene rubber.

The material of the current collector for the negative electrode is not limited to a particular material, and any electronic conductor can be used as long as the conductor does not cause any chemical change in the fabricated battery. As the material constituting the current collector, examples include stainless steel, nickel, copper, titanium, and carbon, as well as a material such as copper or stainless steel with the surface treated with carbon, nickel, titanium or silver, or an Al—Cd alloy. Among them, copper or a copper alloy is preferred. The surface of these materials may be treated with oxidization. Alternatively, the surface of the collector may be roughened to form convex and concave by surface treatment.

As for the current collector shape, a foil, a film, a sheet, a net, a punched sheet, a lath body, a porous body, a foamed body, or fiber molding can be used, as in the case for the above positive electrode. The thickness is not particularly specified, but the thickness between 1 μm and 500 μm is preferable.

In addition to the electrically conductive material and the binder, a filler, a dispersing agent, an ion conducting material, a pressure reinforcing agent, and other various additives may be added into the electrode material mixture. Any fibrous material can be used for the filler as long as it does not cause any chemical change in the fabricated battery. Usually, an olefin polymer fiber such as polypropylene or polyethylene, a glass fiber or a carbon fiber is used. The amount of the filler to be added is not particularly specified, but from 0 to 30 wt % is preferable.

The positive and negative electrodes used in the present invention may have, in addition to the mixture layer containing the positive electrode active material or negative electrode material, other layers such as a base coat layer intended to improve the adhesion between the current collector and the mixture layer, the electrical conductivity, the cycle characteristics, and the charge/discharge efficiency, and a protective layer intended for mechanical and chemical protection of the mixture layer. The base coat layer and the protective layer may contain a binder or electrically conductive particles or electrically non-conductive particles.

As the separator, an insulating microporous thin film having large ion permeability and a specified mechanical strength is used. Preferably, the film has the function of closing the pores and increasing the resistance at a temperature of 80° C. or higher. A sheet or non-woven fabric made of an olefin polymer such as polypropylene, polyethylene or the combination thereof, or glass fiber is used in view of the resistance to an organic solvent and hydrophobicity.

It is desirable that the pore diameter of the separator be small enough to prevent the active material, the binder, the electrically conductive material and the like separated from the electrode sheet from passing through the separator; specifically, a diameter of from 0.1 to 1 μm is desirable. As for the separator thickness, a thickness of from 10 to 300 μm is usually preferable. Porosity is determined in accordance with the electron or ion permeability, the material used, the film thickness and the like, and generally a porosity of from 30 to 80% is desirable. Further, when a flame retardant or nonflammable material such as glass or metal oxide film is used, the safety of the battery is further enhanced.

The non-aqueous electrolyte used in the present invention comprises a solvent and a lithium salt dissolved in the solvent. The preferable solvent is one ester or an ester mixture. Above all, cyclic carbonates, cyclic carboxylic acid esters, non-cyclic carbonates, aliphatic carboxylic acid esters and the like are preferred. Further, solvent mixtures containing cyclic carbonates and non-cyclic carbonates, solvent mixtures containing cyclic carboxylic acid esters, and solvent mixtures containing cyclic carboxylic acid esters and cyclic carbonates are preferred.

Examples of the solvent and other solvent to be used in the present invention are described below.

As the ester used as the non-aqueous solvent, there are cyclic carbonates such as ethylene carbonate (EC), propylene carbonate (PC), butylene carbonate (BC) and vinylene carbonate (VC), non-cyclic carbonates such as dimethyl carbonate (DMC), diethyl carbonate (DEC), ethyl methyl carbonate (EMC), and dipropyl carbonate (DPC), aliphatic carboxylic acid esters such as methyl formate (MF), methyl acetate (MA), methyl propionate (MP) and ethyl propionate (MA), and cyclic carboxylic acid esters such as γ-butyrolactone (GBL).

As the cyclic carbonate, EC, PC, VC and the like are particularly preferred; as the cyclic carboxylic acid ester, GBL and the like are particularly preferred; and as the non-cyclic carbonate, DMC, DEC, EMC and the like are preferred. Optionally, aliphatic carboxylic acid esters may also be used. The amount of the aliphatic carboxylic acid ester is preferably 30% or less of the total weight of the solvent, and more preferably 20% or less.

The solvent in the electrolyte solution of the present invention may contain a well-known aprotic organic solvent, in addition to the above ester in an amount of 80% or more.

As the lithium salt dissolved in the solvent, for example, there are $LiClO_4$, $LiBF_4$, $LiPF_6$, $LiAlCl_4$, $LiSbF_6$, LiSCN, $LiCF_3SO_3$, $LiCF_3CO_2$, $Li(CF_3SO_2)_2$, $LiAsF_6$, $LiN(CF_3SO_2)2$, $LiB_{10}Cl_{10}$, lithium lower aliphatic carboxylate, chloroborane lithium, lithium tetraphenyl borate, and imides such as $LiN(CF_3SO_2)(C_2F_5SO_2)$, $LiN(CF_3SO_2)_2$, $LiN(C_2F_5SO_2)_2$ and $LiN(CF_3SO_2)(C_4F_9SO_2)$. These salts can be used in the electrolyte solution alone or in any combination thereof within the scope of the present invention if the effect is not impaired. Among them, it is particularly preferable to add $LiPF_6$.

For the non-aqueous electrolyte solution used in the present invention, an electrolyte solution containing at least ethylene carbonate and ethyl methyl carbonate, and $LiPF_6$ as a lithium salt, is particularly preferable. An electrolyte solution containing GBL as the main solvent is also preferred, and in this case, it is preferable to add an additive such as VC in an amount of several %, and to use a salt mixture of $LiBF_4$ and $LiN(C_2F_5SO_2)_2$ as the lithium salt instead of $LiPF_6$.

The amount of the electrolyte used in the battery is not particularly specified, but a suitable amount should be used according to the amounts of the positive electrode active material and the negative electrode material and the size of the battery. The amount of the lithium salt to be dissolved in the non-aqueous solvent is not particularly specified, but preferred amount is 0.2 to 2 mol/l, and more preferably from 0.5 to 1.5 mol/l.

This electrolyte solution is usually impregnated or filled into the separator comprising, for example, a porous polymer, glass filter, or non-woven fabric before use. In order to make the electrolyte solution nonflammable, a halogen-containing solvent such as carbon tetrachloride or chlorotrifluoroethylene may be added into the electrolyte solution. Also, a carbon dioxide gas may be added into the electrolyte solution in order to confer suitability for high temperature storage.

Instead of the liquid electrolyte, the following solid electrolyte can also be used. The solid electrolyte is classified into inorganic and organic solid electrolytes.

As the inorganic solid electrolyte, nitrides of Li, halides of Li, and oxysalt of Li are well known. Among them, $Li_4SiO_4$, $Li_4SiO_4$—LiI—LiOH, $xLi_3PO_4$-$(1-x)Li_4SiO_4$, $Li_2SiS_3$, $Li_3PO_4$—$Li_2S$—$SiS_2$ and phosphorus sulfide compound are effectively used.

As the organic solid electrolyte, on the other hand, polymer materials such as polyethylene oxide, polypropylene oxide, polyphosphazone, polyaziridine, polyethylene sulfide, polyvinyl alcohol, polyvinylidene fluoride, polyhexafluoropropylene, and their derivatives, their mixtures and their complexes are effectively used.

It is also possible to use a gel electrolyte prepared by impregnating the organic solid electrolyte with the above non-aqueous liquid electrolyte. As the organic solid electrolyte, polymer matrix materials such as polyethylene oxide, polypropylene oxide, polyphosphazone, polyaziridine, polyethylene sulfide, polyvinyl alcohol, polyvinylidene fluoride, polyhexafluoropropylene, and their derivatives, their mixtures and their complexes, are effectively used. In particular, a copolymer of vinylidene fluoride and hexafluoropropylene and a mixture of polyvinylidene fluoride and polyethylene oxide are preferable.

As for the shape of the battery, any type such as coin type, button type, sheet type, cylindrical type, flat type and rectangular type can be used. In the case of a coin or button type battery, the positive electrode active material mixture and negative electrode active material mixture are compressed into the shape of a pellet for use. The thickness and diameter of the pellet may be determined according to the size of the battery.

In the case of a sheet, cylindrical or rectangular type battery, the material mixture containing the positive electrode active material or the negative electrode material is usually applied (for coating) onto the current collector, and dried and compressed for use. A well-known applying method can be used such as a reverse roll method, direct roll method, blade method, knife method, extrusion method, curtain method, gravure method, bar method, casting method, dip method, and squeeze method. Among them, the blade method, knife method, and extrusion method are preferred.

The application is conducted preferably at a rate of from 0.1 to 100 m/min. By selecting the appropriate applying method according to the solution properties and drying characteristics of the mixture, an applied layer with good surface condition can be obtained. The application of the material mixture to the current collector can be conducted on one side of the current collector, or on the both sides thereof at the same time. The applied layers are preferably formed on both sides of the current collector, and the applied layer on one side may be constructed from a plurality of layers including a mixture layer. The mixture layer contains a binder and an electrically conductive material, in addition to the material responsible for the absorbing and desorbing lithium ions, like the positive electrode active material or negative electrode material. In addition to the mixture layer, a layer containing no active material such as a protective layer, a base coat layer formed on the current collector, and an intermediate layer formed between the mixture layers may be provided. It is preferred that these layers having no active material contain electrically conductive particles, insulating particles, a binder and the like.

The application may be performed continuously or intermittently or in such a manner as to form stripes. The thickness, length, and width of the applied layer is determined according to the size of the battery, but the thickness of one face of the applied layer which is dried and compressed is preferably 1 to 2000 μm.

As the method for drying or dehydrating the pellet and sheet of the material mixture, any conventional method can be used. In particular, the preferred methods are heated air, vacuum, infrared radiation, far infrared radiation, electron beam radiation and low humidity air, and they can be used alone or in any combination thereof.

The preferred temperature is in the range of 80 to 350° C., and most preferably 100 to 250° C. The water content of the battery as a whole is preferably 2000 ppm or less, and the water content for the positive electrode material mixture, negative electrode material mixture and electrolyte is preferably 500 ppm or less in view of the cycle characteristics.

For the sheet pressing method, any conventional method can be used, but a mold pressing method or a calender pressing method is particularly preferred. The pressure for use is not particularly specified, but from 0.2 to 3 t/cm$^2$ is preferable. In the case of the calender pressing method, a press speed is preferably from 0.1 to 50 m/min.

The pressing temperature is preferably from room temperature to 200° C. The ratio of the width of the positive electrode sheet to that of the negative electrode sheet is preferably 0.9 to 1.1, and more preferably 0.95 to 1.0. The content ratio of the positive electrode active material to the negative electrode material cannot be specified because it differs according to the kind of the compound used and the formulation of the mixture, but those skilled in the art would set an optimum value considering the capacity, cycle characteristics and safety.

It is not necessary that the wound electrode structure in the present invention be in a true cylindrical shape; it may be in any shape such as an elliptic cylinder whose cross section is an ellipse or a rectangular column having a prismatic shape or a rectangular face.

Figure 27:
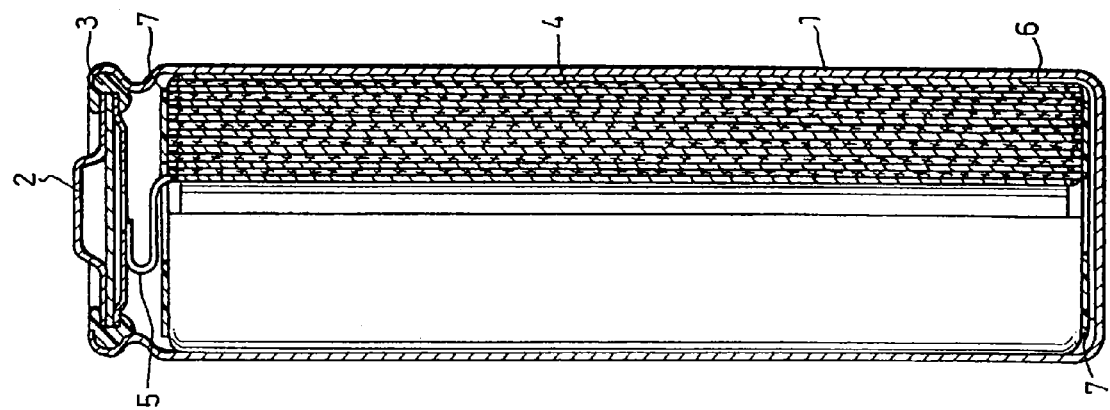
FIG. 27 is a front view, with a partially vertical cross section, of a cylindrical battery produced in Examples.

Here, FIG. 27 shows a front view, in vertical cross section, of a cylindrical battery produced in Examples described hereinafter. An electrode assembly 4 obtained by spirally winding positive and negative electrode plates with a separator interposed therebetween is housed in a battery case 1. A positive electrode lead 5 attached to the positive electrode plate is connected to a sealing plate 2, and a negative electrode lead 6 attached to the negative electrode plate is connected to the bottom of the battery case 1. The battery case and the lead plate can be formed using a metal or alloy with electronic conductivity and chemical resistance to organic electrolyte. For example, a metal such as iron, nickel, titanium, chromium, molybdenum, copper, aluminum, or an alloy made of these metals can be used. In particular, it is most preferable to use a stainless steel plate or a processed Al—Mn alloy plate for the battery case, aluminum for the positive electrode lead, and nickel for the negative electrode lead. It is also possible to use various engineering plastics or the combination of the engineering plastic and a metal for the battery case in order to reduce the weight of the battery.

Insulating rings 7 are respectively provided on both top and bottom of the electrode assembly 4. Subsequently, an electrolyte is charged thereinto, and the battery case is sealed with the sealing plate. Here, the sealing plate can be provided with a safety valve. Instead of the safety valve, it may be provided with a conventional safety device. For instance, as an overcurrent-preventing device, fuse, bimetal, PTC device or the like is used. Besides the safety valve, as a method for preventing the internal pressure of the battery case from increasing, making a notch in the battery case, cracking the gasket or the sealing plate, or cutting the lead plate can be employed. Alternatively, a protective circuit including means for preventing overcharge and overdischarge may be contained in a charger, or may be independently connected to the battery.

In order to prevent overcharge, a method to interrupt the electric current by the increase of the internal pressure of the battery can be used. In this method, a compound which increases the internal pressure can be added into the mixture or the electrolyte. For the compound which increases the internal pressure, carbonate such as $Li_2CO_3$, $LiHCO_3$, $Na_2CO_3$, $NaHCO_3$, $CaCO_3$ and $MgCO_3$ can be used. As the method for welding the cap, the battery case, the sheet and the lead plate, any well-known method (i.e. AC or DC electric welding, laser welding or ultrasonic welding) can be used. For the sealing agent for sealing, a conventional compound or mixture such as asphalt can be used.

In the following, the present invention is described with reference to representative examples, but it is to be understood that the present invention is not limited to them.

Example 1 and Comparative Examples 1 to 2

Cylindrical batteries as shown in FIG. 27 were produced.

First, a positive electrode plate was produced as follows. Ten parts by weight of carbon powder as the electrically conductive material and 5 parts by weight of polyvinylidene fluoride resin as the binder were mixed with 85 parts by weight of powdered positive electrode active material of the present invention. The resulting mixture was then dispersed into dehydrated N-methylpyrrolidinone to obtain a slurry, which was then applied on the positive electrode current collector formed from an aluminum foil, followed by drying and pressing, and the foil was cut into the specified size to obtain a positive electrode plate.

A negative electrode was produced as follows. A carbonaceous material as the main material and a styrene-butadiene rubber type binder were mixed in a weight ratio of 100:5, and the resulting mixture was applied on both surfaces of a copper foil, followed by drying and pressing, and the foil was cut into the specified size to obtain a negative electrode plate.

A microporous polyethylene film was used as the separator. An organic electrolyte was prepared by dissolving $LiPF_6$ at 1.5 mol/l into a solvent mixture of ethylene carbonate and ethyl methyl carbonate in a volumetric ratio of 1:1. The fabricated cylindrical battery was 18 mm in diameter and 650 mm in height.

As the positive electrode active material, $Li[Li_{0.03}(Ni_{1/2}Mn_{1/2})_{0.97}]O_2$ (Example 1-1) or $Li[Li_{0.03}(Ni_{1/3}Mn_{1/3}Co_{1/3})_{0.97}]O_2$ (Example 1-2) was used. These materials were found by TEM image and electron beam diffraction as above to have signals exhibiting a twining portion and a superlattice arrangement within the particle.

For comparison, another positive electrode active material was prepared, instead of the manner as used to produce the positive electrode active material in accordance with the present invention, by mixing powdered lithium hydroxide, powdered nickel hydroxide and powdered manganese oxyhydroxide in the same composition ratio as in Example 1. All the steps after baking were the same as those of producing the positive electrode active material of the present invention. A cylindrical battery was produced in the same manner as in Example 1 using the material thus obtained (Comparative Example 1). The material was examined by TEM image and electron beam diffraction, finding no signal indicating a twining portion and a superlattice.

For further comparison, a cylindrical battery was produced in the same manner using $LiCoO_2$ as the positive electrode active material (Comparative Example 2).

In addition to that, two more cylindrical batteries were produced in the same manner as in Example 1 respectively using $Li[Li_{0.03}(Ni_{1/2}Mn_{1/2})_{0.97}]O_2$ (Example 1-3) and $Li[Li_{0.03}(Ni_{1/3}Mn_{1/3}Co_{1/3})_{0.97}]O_2$ (Example 1-4), both of which were obtained by baking at 1000° C. and then by slowly cooling down to room temperature for 48 hours. They were evaluated in the same manner as in Example 1.

[Evaluation]

These batteries were evaluated in terms of electric capacity, rate capacity and cycle characteristic.

(i) Electric Capacity

First, each battery was charged at a constant current of 100 mA to 4.2 V, and then discharged at a constant current of 100 mA to 2.0V. This charge/discharge cycle was repeated several times. Its capacity was observed when the battery capacity was almost constant.

The capacity was observed in the following manner. First, the charging was performed at a constant voltage of 4.2 V and maximum current was 1 A. The charging was completed when the current value reached 50 mA. The discharging was performed at a constant current of 300 mA to 2.5 V. The discharge capacity obtained here is referred to as electric capacity of the battery. The electric capacity in Table 4 was calculated by setting the electric capacity of conventional $LiCoO_2$ in Comparative Example 2 to 100. The charging and discharging was performed in an atmosphere at 25° C.

(ii) Rate Capacity

The capacity was measured after each battery was discharged at a constant current of 1000 mA to 2.5 V. Then, rate capacity value was determined by calculating the percentage (%) of capacity at 1000 mA discharge to that at 300 mA discharge. Accordingly, the larger the value, the better rate capacity the battery had.

(iii) Cycle Life

The charging and discharging was repeated 500 times. Since the batteries of Example 1 and Comparative Examples 1 and 2 had different capacities, Table 4 shows the battery capacity after 500 cycles calculated by setting the capacity before the cycle life test to 100. Accordingly, the value represents cycle degradation ratio, and the larger the value, the better the cycle life.

TABLE 4

| EX. | Composition | Electric capacity | Rate performance | 25° C. cycle | Note |
|---|---|---|---|---|---|
| 1-1 | $Li[Li_{0.03}(Ni_{1/2}Mn_{1/2})_{0.97}]O_2$ | 107 | 93 | 81 | Rapid heating/quenching |
| 1-2 | $Li[Li_{0.03}(Ni_{1/3}Mn_{1/3}Co_{1/3})_{0.97}]O_2$ | 111 | 95 | 80 | Rapid heating/quenching |
| 1-3 | $Li[Li_{0.03}(Ni_{1/2}Mn_{1/2})_{0.97}]O_2$ | 104 | 88 | 72 | No quenching |
| 1-4 | $Li[Li_{0.03}(Ni_{1/3}Mn_{1/3}Co_{1/3})_{0.97}]O_2$ | 105 | 89 | 70 | No quenching |
| Comp. Ex. 1 | $Ni(OH)_2$ + MnOOH compound | 92 | 72 | 52 | — |
| Comp. Ex. 2 | $LiCoO_2$ | 100 | 85 | 63 | — |

Table 4 indicates the batteries with the positive electrode active material in accordance with the present invention are superior in electric capacity, rate capacity and cycle life. It also indicates that all the characteristics of the batteries of Examples 1-1 and 1-2 are improved compared to those of batteries of Examples 1-3 and 1-4 by the addition of the quenching step.

As described above, it is possible to provide a lithium secondary battery superior to that with conventional $LiCoO_2$ by using a positive electrode active material in accordance with the present invention.

Example 2

Stability of Material $LiNiO_2$ is very unstable after Li leaves $LiNiO_2$ by charging. Accordingly, $LiNiO_2$ loses oxygen at a relatively low temperature and then is reduced to NiO. This would create a serious problem when $LiNiO_2$ is used as the positive electrode active material for batteries. Specifically, thermal runaway of battery is expected to occur due to oxygen generated and eventually to lead to ignition or rupture.

The present inventors have suggested that such disadvantage can be overcome by using an oxide incorporating nickel and manganese at a ratio of 1:1, or that incorporating nickel, manganese and cobalt at a ratio of 1:1:1. In addition, they have also proposed to use, in a battery, a positive electrode active material obtained by doping, with aluminum, $Li[Li_{0.03}(Ni_{1/2}Mn_{1/2})_{0.97}]$ or $Li[Li_{0.03}(Ni_{1/3}Mn_{1/3}Co_{1/3})_{0.97}]O_2$.

It has been made clear that doping, with aluminum, the vicinity of the surface of the composite oxide having precisely controlled particle morphology in accordance with the present invention can improve the heat resistance. It has been confirmed by TEM image and electron beam diffraction that the particle morphology of aluminum-doped material also has the characteristics of the present invention. The amount of added element such as aluminum, calcium, strontium, zirconium, yttrium and ytterbium was 5 atom % of the total amount of nickel and manganese.

Batteries as shown in FIG. 27 were produced using different materials obtained by doping $Li[Li_{0.03}(Ni_{1/2}Mn_{1/2})_{0.97}]$ or $Li[Li_{0.03}(Ni_{1/3}Mn_{1/3}Co_{1/3})_{0.97}]O_2$ with the above-mentioned added element. Each battery was overcharged to 4.8 V, which was then disassembled and the positive electrode material mixture was taken out therefrom. The obtained positive electrode material mixture was subjected to DSC (differential scanning calorimetry) measurement. Table 5 shows the exothermic peak (1st peak) observed at the lowest temperature. The batteries of Examples 1 and 2 were also evaluated in the same manner.

TABLE 5

| EXAMPLE | Parent material | Added element | Result of DSC measurement |
|---|---|---|---|
| 1-1 | $Li[Li_{0.03}(Ni_{1/2}Mn_{1/2})_{0.97}]O_2$ | — | 200 |
| 1-2 | $Li[Li_{0.03}(Ni_{1/3}Mn_{1/3}Co_{1/3})_{0.97}]O_2$ | — | 190 |
| 2-1 | $Li[Li_{0.03}(Ni_{1/2}Mn_{1/2})_{0.97}]O_2$ | Al | 215 |
| 2-2 | $Li[Li_{0.03}(Ni_{1/2}Mn_{1/2})_{0.97}]O_2$ | Ca | 207 |
| 2-3 | $Li[Li_{0.03}(Ni_{1/2}Mn_{1/2})_{0.97}]O_2$ | St | 210 |
| 2-4 | $Li[Li_{0.03}(Ni_{1/2}Mn_{1/2})_{0.97}]O_2$ | Zr | 212 |
| 2-5 | $Li[Li_{0.03}(Ni_{1/2}Mn_{1/2})_{0.97}]O_2$ | Y | 210 |
| 2-6 | $Li[Li_{0.03}(Ni_{1/2}Mn_{1/2})_{0.97}]O_2$ | Yb | 208 |
| 2-7 | $Li[Li_{0.03}(Ni_{1/3}Mn_{1/3}Co_{1/3})_{0.97}]O_2$ | Al | 205 |
| 2-8 | $Li[Li_{0.03}(Ni_{1/3}Mn_{1/3}Co_{1/3})_{0.97}]O_2$ | Ca | 200 |
| 2-9 | $Li[Li_{0.03}(Ni_{1/3}Mn_{1/3}Co_{1/3})_{0.97}]O_2$ | St | 201 |
| 2-10 | $Li[Li_{0.03}(Ni_{1/3}Mn_{1/3}Co_{1/3})_{0.97}]O_2$ | Zr | 203 |
| 2-11 | $Li[Li_{0.03}(Ni_{1/3}Mn_{1/3}Co_{1/3})_{0.97}]O_2$ | Y | 202 |
| 2-12 | $Li[Li_{0.03}(Ni_{1/3}Mn_{1/3}Co_{1/3})_{0.97}]O_2$ | Yb | 201 |
| Comp. Ex. 2 | $LiCoO_2$ | — | 118 |

Table 5 indicates that all the batteries of the present invention had higher exothermic temperature than the battery with $LiCoO_2$. This can be explained as follows. In the case of $LiCoO_2$, the whole lattice of $LiCoO_2$ expands due to overcharging. This makes the crystal structure unstable and oxygen is likely to be released. When the temperature is increased in this state, an exothermic reaction presumably resulting from the released oxygen is observed. On the other hand, although it is not apparent from the materials of Examples of the present invention, it is surmised that it is because of the combination of the fact that the oxidation reduction reaction with an organic substance (i.e. electrolyte) at the surface of the material was restrained and the fact that the oxygen release due to the lattice expansion was suppressed. Further, in the case where aluminum or the like was added, this effect enhanced, the temperature increased significantly to greatly improve the thermal stability of the positive electrode active material. The added amount was investigated to find that desired effect was obtained in the range of 0.05 to 20 atom % of the total amount of the transition metal elements. When the amount was less than 0.05 atom %, sufficient effect was not attained. Conversely, when the amount exceeded 20 atom %, the capacity was decreased.

Example 3

Electron Conductivity of Material

It has been already proposed that doping $Li[Li_{0.03}(Ni_{1/2}Mn_{1/2})_{0.97}]O_2$ of the present invention with a different element can give a material which can represent an additional function, and that the addition of magnesium greatly improves the electron conductivity. It has also been made clear that doping, with magnesium, the vicinity of the surface of the composite oxide having precisely controlled particle morphology in accordance with the present invention can improve the electron conductivity.

This makes it possible to reduce the amount of the electrically conductive material to be added to the positive electrode plate. Thereby, the amount of the active material to be added can be increased, leading to an increase in capacity.

In this example, an electrode plate using the mixture obtained by mixing 3 parts by weight of powdered carbonaceous material as the electrically conductive material and 4 parts by weight of polyvinylidene fluoride as the binder with 93 parts by weight of powdered positive electrode active material was produced. The electron conductivity of thus-obtained electrode plate was measured. In the measurement, resistance value in the direction of the cross section of the electrode plate was measured, which was then converted into an electron conductivity per cross-sectional area. Table 6 shows the results of the measurement calculated by setting the electron conductivity of the electrode plate using $Li[Li_{0.03}(Ni_{1/2}Mn_{1/2})_{0.97}]O_2$ to 100. Electrode plates using the magnesium-added positive electrode active material and different amounts of the electrically conductive material were subjected to the electron conductivity measurement. The added amount of magnesium was 2 atom %.

TABLE 6

| EX-AMPLE | Parent material | Added amount of conductive agent (wt %) | Electron conductivity (ratio) |
|---|---|---|---|
| 1-1 | $Li[Li_{0.03}(Ni_{1/2}Mn_{1/2})_{0.97}]O_2$ | 3 | 100 |
| 1-2 | $Li[Li_{0.03}(Ni_{1/3}Mn_{1/3}Co_{1/3})_{0.97}]O_2$ | 3 | 101 |
| 3-1 (Parent material 1-1) | Added with 2 atom % of magnesium | 1 | 98 |
| | Added with 2 atom % of magnesium | 2 | 100 |
| | Added with 2 atom % of magnesium | 3 | 103 |
| 3-2 (Parent material 1-2) | Added with 2 atom % of magnesium | 1 | 99 |
| | Added with 2 atom % of magnesium | 2 | 101 |
| | Added with 2 atom % of magnesium | 3 | 104 |
| Comp. Ex. 2 | $LiCoO_2$ | 1 | 84 |
| | $LiCoO_2$ | 3 | 98 |

Table 6 indicates that, in the case of doping with magnesium, the electrode plates with 2 atom % of the electrically conductive material had similar electron conductivity as those with conventional 3 atom % of the electrically conductive material. Regarding the added amount, a similar tendency to the case of aluminum was shown. However, because magnesium not used for doping is detected as an impurity when the added amount is increased, preferred amount is 0.05 to 10 atom %.

It is to be noted that, although Examples used a carbonaceous material as the negative electrode active material in order to evaluate the performance of the positive electrode, the material for the negative electrode active material is not limited thereto. It is possible to use alloys, lithium metal, oxides and nitrides which have a relatively low potential. Regarding the electrolyte, it is also to be understood that, although the electrolyte was prepared by dissolving 1.5 mol/l of $LiPF_6$ in a solvent mixture of ethylene carbonate and ethyl methyl carbonate in a volumetric ratio of 1:1 in Examples, the electrolyte is not limited thereto. It is also possible to use organic or inorganic solid electrolyte.

According to the present invention, it is possible to effectively use an inexpensive nickel-manganese composite oxide as a positive electrode active material, and to provide a non-aqueous electrolyte secondary battery with high capacity, excellent rate capacity and longer cycle life.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A positive electrode active material comprising a lithium-containing composite oxide containing at least nickel and manganese elements, said positive electrode active material comprising primary particles of said composite oxide having a twinning portion, the composite oxide further contains cobalt element, and the nickel, manganese, and cobalt elements are uniformly dispersed at the atomic level,
   wherein said composite oxide has a layered crystal structure and the arrangement of oxygen atoms is a cubic close-packed structure,
   wherein said composite oxide contains nickel, manganese and cobalt elements at a ratio satisfying Co/(Ni+Mn) ≦1; and
   the lithium-composite oxide is formed by
   (a) coprecipitating nickel, manganese and cobalt in an aqueous solution to form a composite hydroxide containing nickel, manganese and cobalt,
   (b) heating the composite hydroxide to form a dry precursor,
   (c) mixing the dry precursor with a lithium compound to form a mixture,
   (d) rapidly heating the mixture at a rising temperature rate of not less than 7° C./min to a baking temperature of higher than 750° C., and
   (e) subsequently quenching the mixture at a cooling rate of not less than 5° C./min from the baking temperature to 700° C. or lower.

2. The positive electrode active material in accordance with claim 1, wherein said composite oxide has a defected or disordered portion in the crystal lattice thereof.

3. The positive electrode active material in accordance with claim 1, wherein said composite oxide has a superlattice arrangement of a [$\sqrt{3}\times\sqrt{3}$] R30° when assigned as R3-m.

4. The positive electrode active material in accordance with claim 1, wherein said composite oxide contains nickel and manganese elements at the same ratio.

5. The positive electrode active material in accordance with claim 1, wherein said composite oxide has an integrated intensity ratio (003)/(104) of the X-ray diffraction peak when assigned as R3-m which satisfies the equation:

$$(003)/(104) \leq 1.2.$$

6. The positive electrode active material in accordance with claim 1, wherein said composite oxide has an extra spot or streak substantially in every electron beam diffraction pattern indexed when assigned as R3-m.

7. The positive electrode active material in accordance with claim 1, wherein said primary particles have at least one of spherical and rectangular parallelepiped hexahedron shapes.

8. The positive electrode active material in accordance with claim 1, wherein said primary particles have a particle size of 0.1 to 2 μm and said primary particles form secondary particles with a particle size of 2 to 20 μm.

9. A non-aqueous electrolyte secondary battery comprising: a negative electrode containing, as a negative electrode active material, a material capable of absorbing and desorbing lithium ions and/or metal lithium; a positive electrode containing the positive electrode active material in accordance with claim 1; and an electrolyte.

10. The positive electrode active material in accordance with claim 1, wherein said composite oxide is represented by $LiCo_{x/3}Ni_{((3-x)/6)}Mn_{((3-x)/6)}O_2$, where $x \leq 1$.

11. The positive electrode active material in accordance with claim 1, wherein said composite oxide contains nickel, manganese and cobalt at a ratio of 1:1:1.

12. The positive electrode active material in accordance with claim 1, wherein said composite oxide is represented by $LiNi_{1/3}Mn_{1/3}Co_{1/3}O_2$.

13. The positive electrode active material in accordance with claim 1, wherein the baking temperature is in a range of 900 to 1200° C.

* * * * *